United States Patent
Nabetani et al.

(10) Patent No.: US 10,321,481 B2
(45) Date of Patent: Jun. 11, 2019

(54) WIRELESS COMMUNICATION DEVICE

(71) Applicant: KABUSHIKI KAISHA TOSHIBA, Minato-ku, Tokyo (JP)

(72) Inventors: Toshihisa Nabetani, Kanagawa (JP); Hiroki Mori, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 137 days.

(21) Appl. No.: 15/437,719

(22) Filed: Feb. 21, 2017

(65) Prior Publication Data
US 2017/0171886 A1    Jun. 15, 2017

Related U.S. Application Data

(63) Continuation of application No. PCT/JP2015/082084, filed on Nov. 16, 2015.

(30) Foreign Application Priority Data

Nov. 18, 2014 (JP) .................................. 2014-233860

(51) Int. Cl.
*H04W 74/08* (2009.01)
*H04B 7/0413* (2017.01)
(Continued)

(52) U.S. Cl.
CPC .......... *H04W 74/08* (2013.01); *H04B 7/0413* (2013.01); *H04B 7/0452* (2013.01);
(Continued)

(58) Field of Classification Search
None
See application file for complete search history.

(56) References Cited

U.S. PATENT DOCUMENTS 8,743,793 B2    6/2014 Wentink et al.
2008/0279210 A1* 11/2008 Naka ................ H04W 28/18
370/448
(Continued)

FOREIGN PATENT DOCUMENTS

JP    H10-173663 A    6/1998
JP    2006-246030 A   9/2006
(Continued)

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
(Continued)

*Primary Examiner* — Rebecca E Song
(74) *Attorney, Agent, or Firm* — Foley & Lardner LLP

(57) ABSTRACT

According to one embodiment, a wireless communication device includes: controlling circuitry configured to determine parameter information on a backoff time of carrier sensing performed according to CSMA/CA (carrier sense multiple access/collision avoidance) on basis of a number of other wireless communication devices which have established connections with the wireless communication device; and a transmitter configured to transmit a first frame which instructs to transmit a response frame according to the parameter information.

15 Claims, 23 Drawing Sheets

(51) Int. Cl.

| | | |
|---|---|---|
| *H04W 72/04* | (2009.01) | |
| *H04B 7/0452* | (2017.01) | |
| *H04B 7/08* | (2006.01) | |
| *H04W 74/00* | (2009.01) | |
| *H04W 4/08* | (2009.01) | |
| *H04W 8/18* | (2009.01) | |
| *H04W 72/12* | (2009.01) | |
| *H04W 84/12* | (2009.01) | |
| *H04W 88/02* | (2009.01) | |
| *H04W 88/08* | (2009.01) | |

(52) U.S. Cl.
CPC ............ *H04B 7/0848* (2013.01); *H04W 4/08* (2013.01); *H04W 8/186* (2013.01); *H04W 72/0413* (2013.01); *H04W 72/121* (2013.01); *H04W 74/002* (2013.01); *H04W 74/085* (2013.01); *H04W 74/0808* (2013.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 2011/0141969 | A1 | 6/2011 | Sridhara et al. |
| 2013/0155955 | A1* | 6/2013 | Nabetani ............... 370/328 |
| 2013/0235720 | A1 | 9/2013 | Wang et al. |
| 2014/0269317 | A1 | 9/2014 | Wang et al. |
| 2015/0237586 | A1 | 8/2015 | Iwai et al. |
| 2018/0199375 | A1* | 7/2018 | Nezou ............... H04W 74/006 |

FOREIGN PATENT DOCUMENTS

| | | |
|---|---|---|
| JP | 2007-266950 A | 10/2007 |
| JP | 2011-528218 A | 11/2011 |
| JP | 2013-255278 A | 12/2013 |
| JP | 2014-165512 A | 9/2014 |
| WO | WO 2010/099497 A1 | 9/2010 |

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ae™, The Institute of Electrical and Electronics Engineers, Inc., Dec. 2013, pp. 1-425.

Stacey, Robert: "Specification Framework for TGax", IEEE 802.11-15/0132r9, Intel, Sep. 2015, pp. 1-22.

Tran Thi Thao Nguyen et al,: "Uplink Multi-User MAC Protocol for 11ax", IEEE 11-14/0598r0, IEEE Mentor, Kyushu Institute of Technology, May 2014, pp. 1-19.

Stacey, Robert: "Specification Framework for TGax", IEEE, 11-15-0132-17-00ax-spec-framework, Intel, May 2016, pp. 1-61.

Koyama et al., "Controls at an Access Point and Terminals for Video Streaming over Wireless LAN and its QoE Evaluation", IEICE Technical Report, Feb. 28, 2011, vol. 110, No. 455.

* cited by examiner

| Frame Control | Duration | RA | TA | STA Info 1 | ... | STA Info n | CW_min | CW_max | FCS |

FIG. 3

| NUMBER OF TERMINALS | CW_min | CW_max |
|---|---|---|
| 1 | a1 | b1 |
| 2 | a2 | b2 |
| 3 | a3 | b3 |
| ... | ... | ... |

FIG. 4

| Frame Control | Duration | RA | TA | DATA SIZE | ALLOWABLE DELAY | FCS |
|---|---|---|---|---|---|---|

FIG. 5

| Frame Control | Duration | RA | TA | Time Limit | STA Info 1 | ... | STA Info n | CW_min | CW_max | FCS |

FIG. 6

| Frame Control | Duration | RA | TA | STA Info 1 For MIMO | ... | STA Info n For MIMO | FCS |

FIG. 7

| Frame Control | Duration | RA | TA | Common Info | STA Info 1 For MIMO | ... | STA Info n For MIMO | CW_min | CW_max | FCS |

FIG. 8

| Frame Control | Duration | RA | TA | PRESENCE/ ABSENCE OF TRANSMISSION DATA | DATA SIZE | ALLOWABLE DELAY | FCS |

FIG. 9

| Frame Control | Duration | RA | TA | GROUP ID | CW_min | CW_max | FCS |
FIG. 10
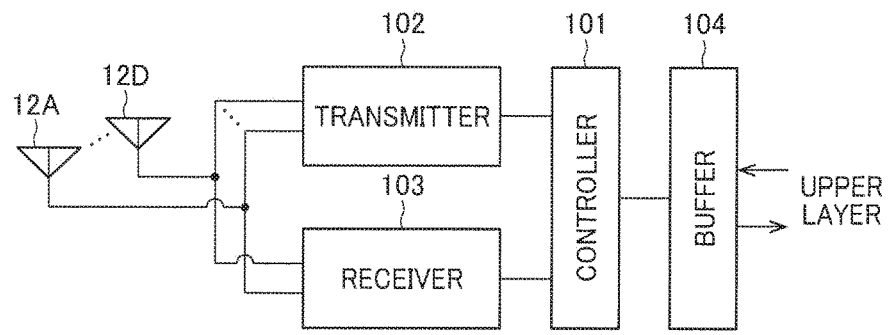
FIG. 11
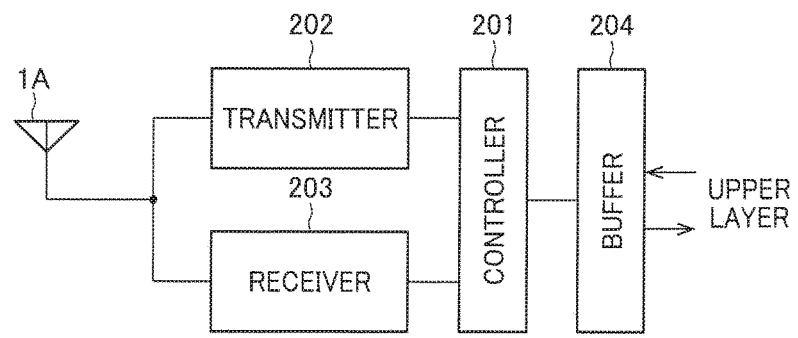
FIG. 12

| Frame Control | Duration | RA | TA | STA Info 1 | ... | STA Info n | CW_min | FCS |

FIG. 16

| Frame Control | Duration | RA | TA | CW_min | CW_max | FCS |

FIG. 17

| Frame Control | Duration | RA | TA | STA Info 1 | ... | STA Info n | FCS |

FIG. 18

WIRELESS COMMUNICATION DEVICE

CROSS REFERENCE TO RELATED APPLICATIONS

This application is a Continuation of International Application No. PCT/JP2015/082084, filed on Nov. 16, 2015, the entire contents of which is hereby incorporated by reference.

FIELD

Embodiments described herein relate to a wireless communication device.

BACKGROUND

Uplink multi-user MIMO (UL-MU-MIMO) transmission under study in IEEE802.11ax requires an access point (AP) to transmit a trigger frame for uplink transmission to a plurality of wireless terminals for which uplink transmission is permitted. A wireless terminal which has received the trigger frame performs uplink transmission in a predetermined time after receiving the trigger frame. Thus, uplink transmission is performed simultaneously from the plurality of wireless terminals.

Even when the AP permits uplink transmission for a wireless terminal which does not store uplink transmission data, data is not transmitted from the wireless terminal, and therefore when uplink transmission is permitted for such a wireless terminal, the corresponding amount of wireless resources becomes wasted. For this reason, a method is conceived for the AP to inquire about whether or not there is uplink transmission data in advance before UL-MU-MIMO starts. The AP inquires about whether or not there is uplink transmission data in advance before UL-MU-MIMO starts, and can thereby reliably give permission to the wireless terminal which stores the uplink transmission data.

On the other hand, such an inquiry may delay the start of UL-MU-MIMO and lead to an increase of overhead (decrease in MAC efficiency).

Furthermore, at the time of UL-MU-MIMO transmission, as the number of selectable wireless terminals from which the AP can select candidates of wireless terminals for which uplink transmission is permitted increases, the number of combined candidates increases. For this reason, it is possible to select combination wireless terminals more suitable for UL-MU-MIMO transmission (from the standpoint of user correlation, frame length, power difference or the like), but this requires inquiries to make more appropriate combinations for many wireless terminals, leading to an increase of overhead accordingly.

BRIEF DESCRIPTION OF THE DRAWINGS

FIG. 3 is a diagram illustrating a frame format example of an inquiry frame;

FIG. 4 is a diagram illustrating a table that defines a relationship among the number of terminals, CW_min and CW_max;

FIG. 5 is a diagram illustrating a format example of a request frame;

FIG. 6 is a diagram illustrating a format example of a request frame to which a time limit field is added;

FIG. 7 is a diagram illustrating a format example of a notification frame;

FIG. 8 is a diagram illustrating an example of a notification frame to which a common information field is added;

FIG. 9 is a diagram illustrating an example of a request frame provided with a transmission data presence/absence bit field;

FIG. 10 is a diagram illustrating an example of an inquiry frame provided with a group ID field;

FIG. 11 is a functional block diagram of a wireless communication device mounted on the access point;

FIG. 12 is a functional block diagram of a wireless communication device mounted on a wireless terminal;

FIG. 16 is a diagram illustrating an example of an inquiry frame without including any CW_max field;

FIG. 17 is a diagram illustrating an example of an inquiry frame without including any terminal information field;

FIG. 18 is a diagram illustrating an example of an inquiry frame from which CW_min and CW_max fields are omitted;

DETAILED DESCRIPTION

According to one embodiment, a wireless communication device includes: controlling circuitry configured to determine parameter information on a backoff time of carrier sensing performed according to CSMA/CA (carrier sense multiple access/collision avoidance) on basis of a number of other wireless communication devices establishing connections with the wireless communication device; and a transmitter configured to transmit a first frame which instructs to transmit a response frame according to the parameter information.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
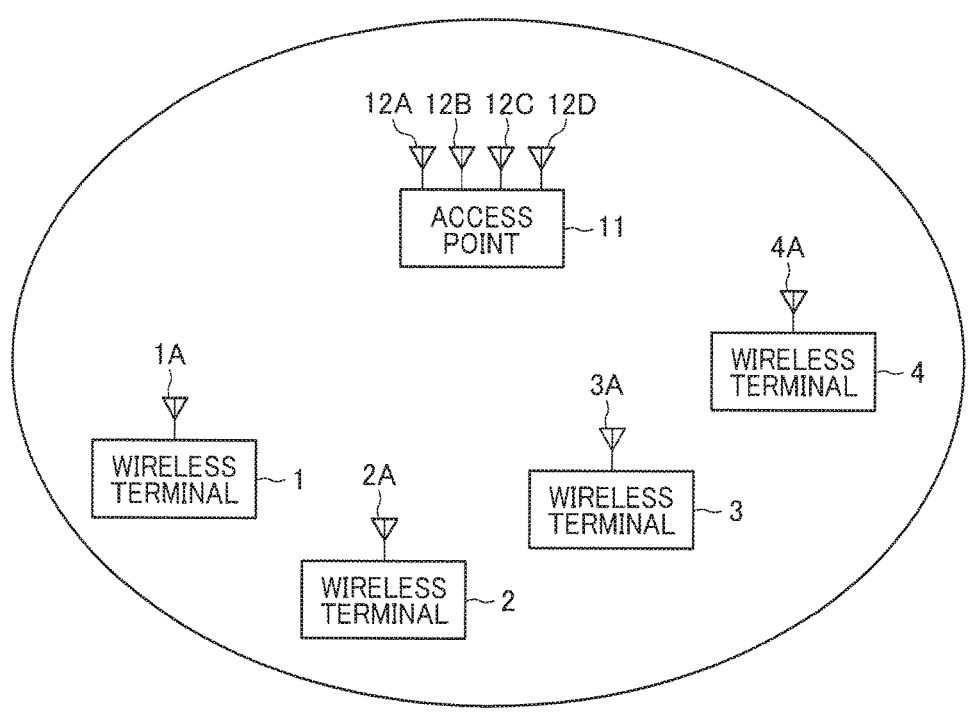
FIG. 1 is a diagram illustrating a wireless communication system according to a first embodiment.

FIG. 1 illustrates a wireless communication system according to a first embodiment.

The wireless communication system in FIG. 1 is a wireless network provided with an access point (AP) 11 and a plurality of wireless terminals 1, 2, 3 and 4. The access point 11 is also a form of a wireless terminal. The access point 11 and the respective wireless terminals 1 to 4 transmit/receive frames according to CSMA/CA (carrier sense multiple access/collision avoidance) as access control. Here, it is assumed that the access point 11 and the respective wireless terminals 1 to 4 perform wireless communication according to the IEEE802.11 standard, but are not limited to this.

The access point 11 is provided with a plurality of antennas, four antennas 12A, 12B, 12C and 12D in the example of FIG. 1. The access point 11 has a wireless communication device mounted thereon to wirelessly communicate the wireless terminals 1 to 4. The wireless communication device is provided with a wireless communicator or an RF integrated circuit that transmits/receives signals to/from the wireless terminals 1 to 4 and a controller or a baseband integrated circuit that controls communication with the plurality of wireless terminals 1 to 4 by transmitting/receiving frames to/from the wireless terminals 1 to 4 via the wireless communicator.

The wireless terminals 1 to 4 are each provided with one or a plurality of antennas. In the example in FIG. 1, each of the wireless terminals 1 to 4 is provided with one antenna 1A, 2A, 3A or 4A respectively. Each wireless terminal has a wireless communication device mounted thereon to wirelessly communicate with the access point 11. The wireless communication device is provided with a wireless communicator or an RF integrated circuit configured to transmit/receive a signal to/from the access point 11, and a controller or a baseband integrated circuit configured to transmit/receive a frame to/from the access point 11 via the wireless communicator and thereby control communication with the access point 11.

The access point 11 forms a wireless network (called a "first network") and any wireless terminal that communicates with the access point 11 needs to belong to this wireless network. The access point 11 may be connected to another wired or wireless network (called a "second network") other than this wireless network. The access point 11 relays communication between the first network and the second network or relays communication among a plurality of wireless terminals belonging to the first network. Data frames generated by the respective wireless terminals 1 to 4 are wirelessly transmitted to the access point 11 and the access point 11 transmits the data frames to another wireless terminal on the first network or transfers the data frames to the second network in accordance with the destination.

In the present embodiment, when data frames generated by the plurality of wireless terminals are transmitted to the access point 11, the data frames can be transmitted in a multiuser multiplexing mode. As an uplink multiuser multiplexing mode, data frames can be transmitted using uplink multi-user MIMO (UL-MU-MIMO) or uplink orthogonal frequency division multiple access (UL-OFDMA). In UL-MU-MIMO transmission, a plurality of wireless terminals transmit frames in a spatial multiplexing mode (simultaneously in the same frequency band) and the access point 11 simultaneously receives these frames and MIMO-demodulates the frames to thereby separate the frames into frames of the respective wireless terminals. UL-MU-MIMO transmission allows frames to be transmitted simultaneously from the plurality of wireless terminals, thus making it possible to improve system throughput.

In order to carry out UL-MU-MIMO transmission, the access point 11 is assumed to acquire information on uplink channel responses as channel information between an antenna of the access point 11 and an antenna of each wireless terminal. For example, the access point 11 causes each wireless terminal to transmit a channel estimation frame (including a known bit pattern or symbol pattern) and estimates uplink channel responses based on signals of the frames received by the access point 11 from each wireless terminal. The access point 11 calculates a reception weight from the estimated uplink channel response and performs MIMO demodulation using a reception weight. The method of acquiring uplink channel responses may be optional and is not limited to the method mentioned here.

In UL-MU-MIMO transmission, the access point 11 receives frames transmitted from the respective wireless terminals in a spatial multiplexing mode via a plurality of antennas, MIMO-demodulates the received signals based on the reception weights calculated from channel responses acquired in advance and thereby separates the received signal into respective frames. In this case, any given technique such as ZF (zero-forcing) method, MMSE (minimum mean square error) method or maximum likelihood estimation method can be used. Each wireless terminal transmits frames at predetermined timing and each wireless terminal thereby transmits frames in a spatial multiplexing mode.

A case has been shown here where channel responses are acquired in advance, but channel responses may also be estimated by setting preamble signals for channel estimation in the physical headers of frames transmitted from the respective wireless terminals and using the preamble signals of frames simultaneously received from the respective wireless terminals. In this case, by setting the preamble signals transmitted from the respective wireless terminals to be orthogonal to each other, the access point can acquire the respective preamble signals separately and can thereby estimate channel responses of the respective wireless terminals. Field portions after the preamble signal can be demodulated using the channel responses. Note that since the physical header portion before each preamble signal is an identical signal among the respective wireless terminals, the access point can correctly decode the signal even when the signals are received simultaneously. Details will be described hereinafter.

Figure 26:
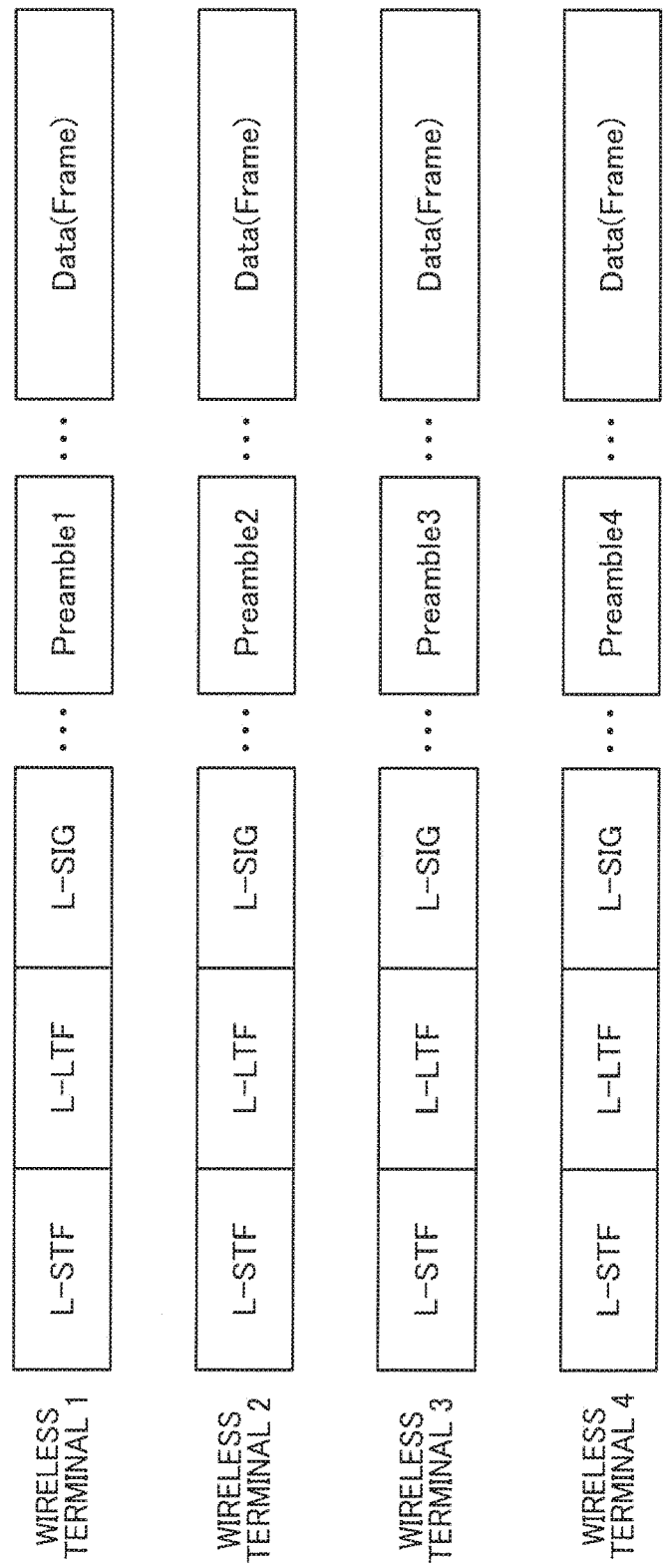
FIG. 26 is a diagram illustrating a schematic format example of a physical packet used for UL-MU-MIMO transmission.

FIG. 26 illustrates examples of configurations of physical packets containing the frames transmitted by the terminals 1 to 4. As illustrated in FIG. 26, each of the preamble signals is disposed in the preamble signal field positioned between an L-SIG field and a frame. Preamble signals 1 to 4 of the terminals 1 to 4 are orthogonal to one another. The fields disposed to the front of each of the preamble signals 1 to 4, such as a Legacy-Short Training Field (L-STF), a Legacy-Long Training Field (L-LTF), and a Legacy Signal Field (L-SIG) are fields that are recognizable by a terminal compliant with a legacy standard such as one in IEEE 802.11a, for example, and have stored therein information related to signal detection, frequency correction (channel estimation), and a transmission rate. The L-STF, the L-LTF, and the L-SIG are the same signals among the plurality of terminals performing the UL-MU-MIMO transmission. The preamble signals described above each corresponds to an example of a communication resource according to the present embodiment. Next, the preamble signals will be explained.

Each of the preamble signals is configured with either a known bit string or a known symbol string. By estimating the channel responses of the uplinks by using the known bit string, the access point 11 is able to spatially separate (decode) the fields properly that are positioned to the rear of the preamble signals. It is possible to realize the spatial separation by using any of the well-known arbitrary methods such as Zero-Forcing (ZF) method, Minimum Mean Square Error (MMSE) method, and maximum likelihood estimation method, for example. In an example, each of the preamble signals is disposed in the physical header (PHY header) positioned on the head side of the MAC frame. In any of the fields positioned to the front of the preamble signals within the physical headers, because signals that are mutually the same are transmitted from the terminals, the access point is able to decode these signals even when the signals are received simultaneously. Further, the preamble signals from the terminals are orthogonal to one another. For this reason, the access point 11 is able to individually recognize each of the preamble signals simultaneously received from the terminals. Accordingly, the access point 11 is able to estimate the uplink channels from the terminals to the access point 11 by using the preamble signals each corresponding to a different one of the terminals. Even though the signals that are mutually different among the terminals are transmitted in the portions positioned to the rear of the preamble signals, the access point 11 is able to separate these signals by utilizing the estimated channel responses.

As a method for arranging the preamble signals among the terminals to be orthogonal to one another, it is possible to use any of the following methods: a time method, a frequency method, and a code method. When a time orthogonalization method is used, the preamble signal field is divided into a plurality of sections, so that the preamble signals from the terminals are transmitted in mutually-different sections. It means that in any one of the sections, only one terminal is transmitting a preamble signal. In other words, while one of the terminals is transmitting a preamble signal, the other terminals are in the time period of transmitting nothing. When the frequency orthogonalization method is used, the terminals transmit preamble signals at frequencies that are in an orthogonal relationship with one another. When the code orthogonalization method is used, the terminals transmit signals having disposed therein value sequences (or, more specifically, symbol sequences corresponding to the value sequences) contained in mutually-different rows (or mutually-different columns) of an orthogonal matrix. The rows (or the columns) of the orthogonal matrix are in an orthogonal relationship with one another. By using any of these orthogonalization methods, the access point 11 is able to recognize the preamble signals of the terminals.

In order for the terminals to use the preamble signals that are orthogonal to one another, the access point needs to provide the terminals with information about the preamble signals to be used by the terminals and the transmission methods therefore. More specifically, it is necessary to provide information such as the timing with which the terminals each transmit the preamble signal (where the preamble signals may be mutually the same or mutually different among the terminals) when the time orthogonalization method is used; the frequency at which the terminals each transmit the preamble signal (where the preamble signals may be mutually different or mutually the same among the terminals) when the frequency orthogonalization method is used; or what code pattern (a pattern of which row/column in the orthogonal matrix) is to be used for transmitting the preamble signals when the code orthogonalization method is used.

On the other hand, OFDMA assigns a resource unit (which may be called "subchannel," "resource block," "frequency block" or the like) including one or a plurality of subcarriers to each of the terminals as a communication resource and communicates them simultaneously with the terminals on a resource unit basis.

Figure 27:
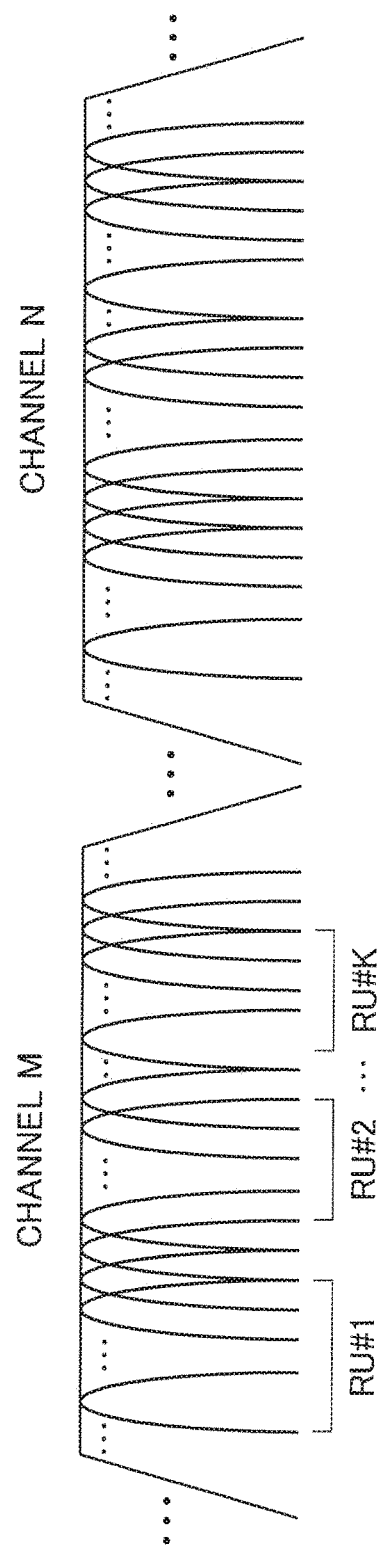
FIG. 27 is a diagram for describing assignment of resource units.

The resource unit is a frequency component which constitutes a minimum unit of a resource for carrying out communication. FIG. 27 illustrates the resource units (RU #1, RU #2 . . . RU #K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. Uplink OFDMA communication is realized by different resource units being simultaneously used by different terminals.

Figure 28:
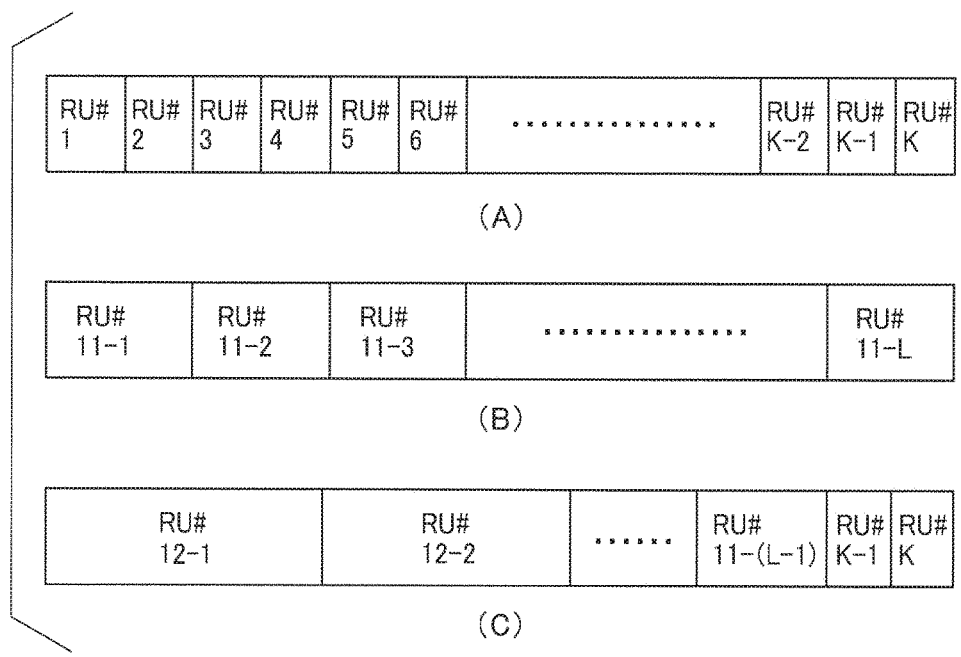
FIG. 28 is a diagram for describing resource unit modes.

The bandwidths of the resource units (or the number of the subcarriers) may be same among the resource units, or the bandwidths (or the number of the subcarriers) may vary depending on the individual resource units. An exemplary arrangement pattern of the resource units within one channel is schematically illustrated in FIG. 28. The width direction on the paper surface corresponds to the frequency domain direction. FIG. 28(A) illustrates an example where a plurality of resource units (RU #1, RU #2 . . . RU #K) having the same bandwidth are arranged, and FIG. 28(B) illustrates another example where a plurality of resource units (RU #11-1, RU #11-2 . . . RU #11-L) having a larger bandwidth than that of FIG. 28(A) are arranged. FIG. 28(C) illustrates a still another example where resource units with three types of bandwidths are arranged. The resource units (RU #12-1, RU #12-2) have the largest bandwidth, the resource unit RU #11-(L-1) has the bandwidth identical to that of FIG. 28(B), and the resource units (RU #K-1, RU #K) have the bandwidth identical to that of FIG. 28(A).

Here, the number of resource units used by each terminal is not limited to a particular value and one or a plurality of resource units may be used. When a terminal uses a plurality of resource units, a plurality of resource units that are continuous in terms of frequency may be used, or a plurality of resource units that are located at positions away from each other may be allowed to be used. The resource unit #11-1 in FIG. 28(B) may be regarded as one example of a resource unit bonding the resource units #1 and #2 FIG. 28(A).

It is assumed here that subcarriers within one resource unit are continuous in the frequency domain. However, resource units may be defined with use of a plurality of subcarriers that are arranged in a non-continuous manner. The channels used in uplink OFDMA communication are not limited to one single channel but resource units may be reserved in another channel (see the channel N in FIG. 27, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

It is assumed here that a terminal that implements OFDMA is capable of carrying out reception and decoding (including demodulation, decoding of error-correcting code, etc.) of a physical packet including a frame on a channel of at least the basic channel width of a legacy terminal (20 MHz channel width if an IEEE 802.11a/b/g/n/ac standard-compliant terminal is regarded as a legacy terminal), meaning; backward-compatible. Carrier sense is carried out in a unit of the basic channel width.

The carrier sense may encompass both physical carrier sense associated with busy/idle of CCA (Clear Channel Assessment) and Virtual Carrier Sense based on medium reserve time described in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as idle by the carrier sense information are all in the idle state.

With regard to OFDMA, channel-based OFDMA is also possible in addition to the above-described resource-unit-based OFDMA. OFDMA of this case may in particular be called MU-MC (Multi-User Multi-Channel). In MU-MC, an access point assigns a plurality of channels (one channel width is, for example, 20 MHz, etc.) to a plurality of terminals, and the plurality of channels are simultaneously used to carry out simultaneous transmissions to the plurality of terminals or simultaneous receptions from the plurality of terminals. The OFDMA which will be described below means the resource-unit-based OFDMA: however, an embodiment of channel-based OFDMA can also be implemented with appropriate replacement of terms and phrases in the following explanations such as reading the "resource unit" as the "channel".

Note that a scheme combining UL-MU-MIMO and UL-OFDMA (UL-MU-MIMO&OFDMA) may be executed as uplink multiuser communication. The UL-OFDMA&MU-MIMO performs MU-MIMO transmission using the same resource unit among a plurality of terminals for each resource unit.

In the example in FIG. 1, since the access point 11 has four antennas, when the maximum number of data streams that can be multiplexed in UL-MU-MIMO transmission is four. When each wireless terminal can transmit one data stream, the number of terminals that can communicate simultaneously is four. A certain one wireless terminal may be provided with a plurality of antennas so as to be able to perform MIMO transmission with two data streams. In FIG. 1, the wireless terminals 1 to 4 establish wireless links with the access point 11, but in addition to the illustrated wireless terminals 1 to 4, there may also be other terminals that establish wireless links with the access point 11. "Establishing a wireless link" here means a state in which association processing and authentication processing are carried out between the access point 11 and a wireless terminal and parameters necessary for communication are exchanged and respective abilities are mutually grasped. In this way, the access point 11 also grasps terminal capability information as to, for example, whether a wireless terminal belonging to a network formed by the access point 11, that is, a wireless terminal that has established a wireless link is a UL-MU-MIMO compatible wireless terminal or not.

Figure 2:
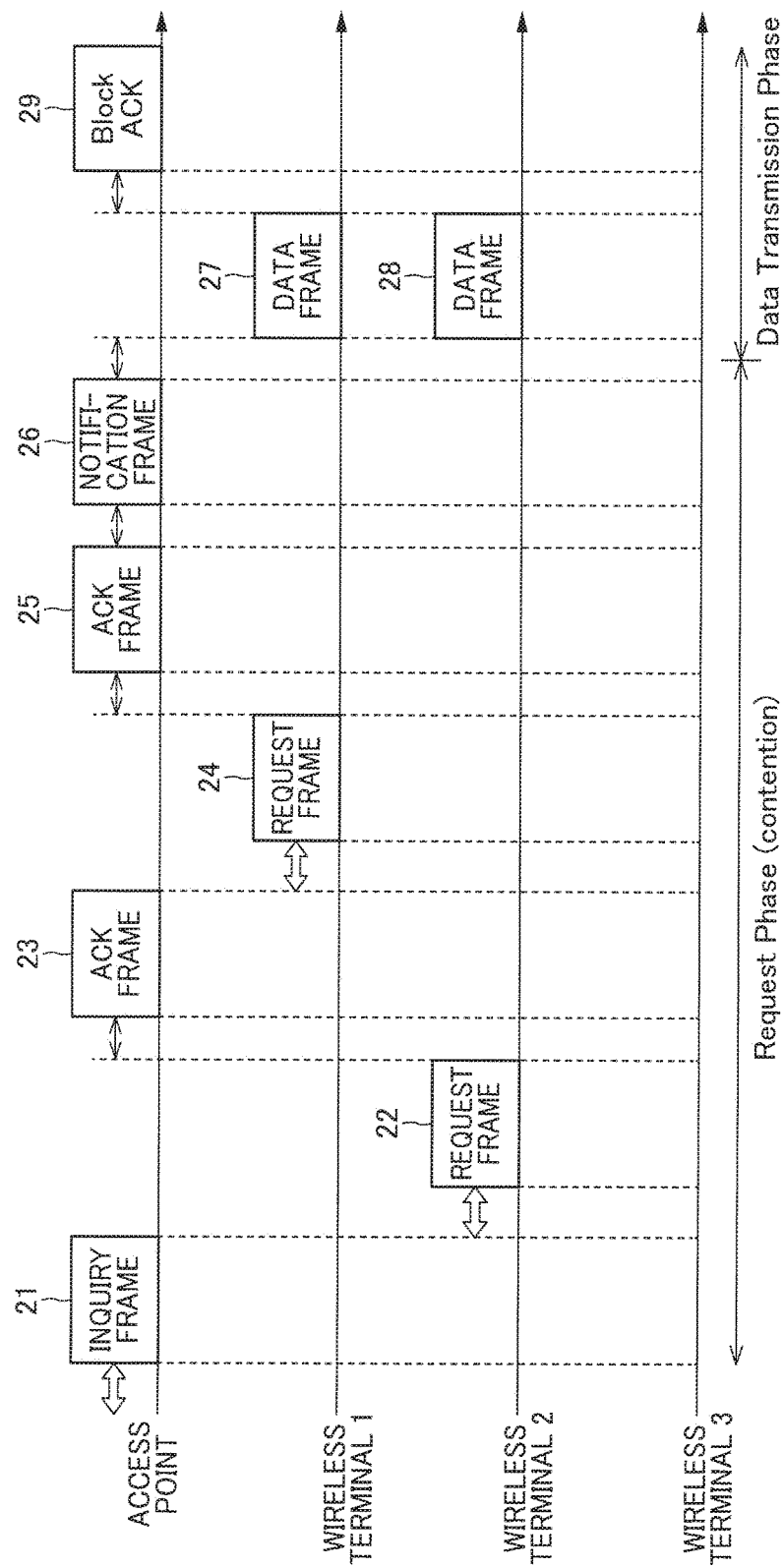
FIG. 2 is a diagram illustrating an example of an operation sequence between an access point and wireless terminals.

FIG. 2 illustrates an example of an operation sequence among the access point 11 and the wireless terminals 1 to 3 shown in FIG. 1. A situation will be assumed in which the wireless terminals 1 and 2 have data to be transmitted to the access point 11 and the wireless terminal 3 has no such data. In FIG. 2, sections denoted by solid line arrows represent short interframe spaces (SIFS) and sections denoted by thick line arrows represent a total (carrier sensing time) of a distributed coordination function interframe space (DIFS) and a backoff time (BackOff). However, SIFS and DIFS are shown by way of example, and may be other times (frame intervals) if they are predetermined times. Note that details of SIFS and DIFS will be described in another embodiment. The operation sequence in FIG. 2 includes a request phase from transmission of an inquiry frame 21 to transmission of a notification frame 26, and a data transmission phase after transmission of the notification frame 26 until transmission of BlockACK frame.

The access point 11 determines to perform UL-MU-MIMO transmission at any given trigger. Such a trigger may be, for example, periodic timing or a case where it is possible to estimate using a certain method that the wireless terminal has uplink transmission data (wireless terminal is performing real-time communication such as VoIP communication) or a case where a request to make an inquiry is received from the wireless terminal in advance. The trigger may be any trigger other than the one mentioned here.

Upon determining to perform UL-MU-MIMO transmission, the access point 11 transmits the inquiry frame 21 to inquire the wireless terminal as to whether the wireless terminal has uplink transmission data as a preparation for UL-MU-MIMO transmission. For this purpose, the access point 11 establishes a wireless link and selects one or a plurality of wireless terminals from among wireless terminals corresponding to UL-MU-MIMO transmission. The access point 11 sets identification information of the selected wireless terminal(s) in corresponding fields (terminal information fields) of the inquiry frame respectively as information for identifying the selected wireless terminal. Thus, the access point 11 specifies wireless terminals to be inquired. Here, the number of terminals selected may be optional, and may be one or plural. The number of terminals to be selected may be equal to a maximum value of the number of data streams (multiplex number) that can be multiplexed in UL-MU-MIMO transmission or greater or smaller than this.

A combination of wireless terminals specified by the inquiry frame may also be determined using any given method. It may be possible to employ a method that establishes a wireless link and selects a wireless terminal group corresponding to UL-MU-MIMO transmission in a round-robin fashion or a method that selects a wireless terminal group having the same data size or a similar data size or a method that selects a wireless terminal group having the same data generation cycle or a similar data generation cycle. Alternatively, if a channel response (channel matrix) to each wireless terminal is grasped in advance, a combination of wireless terminals having a small spatial correlation (having small interference) may be selected.

Furthermore, the access point 11 determines a minimum contention window (CW_min) which is a minimum value of the contention window and a maximum contention window (CW_max) which is a maximum value of the contention window as parameter information relating to a backoff time when performing carrier sensing of CSMA/CA depending on the number of terminals specified by the inquiry frame.

The access point 11 sets the determined values of CW_min and CW_max in the corresponding fields of the inquiry frame 21 respectively. When the wireless terminal is specified by the inquiry frame 21 and has uplink transmission data, the wireless terminal that has received the inquiry frame 21 transmits a request frame indicating to have uplink transmission data as a response frame in response to the inquiry frame. When transmitting this request frame, the access point 11 performs access based on CSMA/CA according to the CW_min and CW_max specified by the inquiry frame. That is, the access point 11 determines the backoff time of carrier sensing for transmission of the request frame according to the CW_min and CW_max specified by the inquiry frame.

Here, FIG. 3 illustrates a frame format example of the inquiry frame 21 transmitted by the access point 11.

The inquiry frame includes a frame control (Frame Control) field, duration (Duration) field, an RA field, a TA field, a plurality of terminal information (STA Info) fields, a CW_min field, a CW_max field and an FCS (Frame Check Sequence) field.

Information indicating the type of the frame or the like is set in the frame control field. The frame type is identified by two fields of a type (Type) and a subtype (Subtype) in the frame control field. The value of subtype for the inquiry frame is newly defined and the type is assumed to be a value indicating a control frame. However, the type is not a control frame and a possibility that the type may be a management frame or a data frame is not excluded. Note that details of the control frame, the management frame and the data frame will be described in another embodiment.

FCS information of the frame (e.g., CRC (cyclic redundancy code)) is set in the FCS field. The FCS information is used for error detection of the frame body section on the receiving side.

A medium reservation time is set in the duration field. When a frame directed to another wireless terminal (not directed to the wireless terminal) is received, a medium is determined to be virtually busy throughout this medium reservation time. A mechanism whereby a medium is determined to be virtually busy or a period during which the medium is determined to be virtually busy is called a "NAV (network allocation vector)."

A MAC address of a wireless terminal which receives the frame is stored in the RA field. A broadcast address or a multicast address may be set in the RA field in the inquiry frame. The RA field may be omitted. A MAC address of a wireless terminal from which the frame is transmitted is stored in the TA field. In the inquiry frame, the MAC address of the access point 11 may be set.

The number of terminal information fields set corresponds to the number of terminals specified by the access point 11. The identification information of the specified terminals is set in the terminal information fields. The identification information may be a MAC address of each terminal or association ID (AID) assigned by the access point 11 at the time of association or an ID, which is unique among terminals. If there is information to be individually notified to the specified terminals, such information may be set in the terminal information fields.

A value of the minimum contention window (CW_min) is set in the CW_min field and a value of the maximum contention window (CW_max) is set in the CW_max field. The values of the CW_min and CW_max are determined by the specification or system in advance, but when a request frame is transmitted, the wireless terminal is caused to use the values notified by the CW_min field and CW_max field of the inquiry frame. That is, the values of CW_min and CW_max used are temporarily changed.

Here, CW_min and CW_max will be described in detail.

According to access control under the CSMA/CA scheme, each wireless terminal performs carrier sensing for a period between a predetermined time after the wireless channel becomes idle and a randomly determined backoff time, and acquires, when the wireless channel is confirmed to be idle, a frame transmission right and transmits a frame. This algorithm is called a "backoff algorithm." A predetermined time before the backoff time is assumed to be "DIFS" in the present embodiment, but another value may also be used. The backoff time is determined by multiplying the value of a random number by a predetermined time called a "slot time." That is, the backoff time=random number×slot time.

The random number is a random integer value generated from a range from 0 to the contention window (CW). The value of CW is variable and is a value within a range between CW_min and CW_max. That is, CW_min≤CW≤CW_max. The value of CW is set to CW_min initially. If CW_min is 7, a random number is generated from a range of 0 to 7. If the random number generated is 3 and the slot time is 9 µs, the backoff time is 27 µs.

When the wireless terminal that has acquired a transmission right transmits a frame, if no ACK frame is returned after SIFS from the partner device, the wireless terminal retransmits the frame. At this time, the wireless terminal performs carrier sensing according to the backoff algorithm for a period of time between DIFS and the randomly determined backoff time, and acquires, when the wireless terminal is confirmed to be idle, the frame transmission right and transmits a frame. At this time, when a random number is generated to determine the backoff time, the random number is generated within a range of 0 to CW or less, but the value of CW is updated to (CW_min+1)×2−1. In the above-described example, CW_min is 7, and therefore (7+1)×2−1=15 is set as CW. Therefore, the random number is set from within a range of 0 to 15. The backoff time is calculated according to the generated random number×slot time.

If the frame transmission this time also fails, the next CW value is set to (CW_min+1)×$2^2$−1=31. More generally, when the retransmission count of a frame is assumed to be n, the CW value becomes (CW_min+1)×$2^n$−1. Thus, the CW value increases as the retransmission count of the frame increases. When the CW value reaches CW_max, the CW value is fixed to CW_max thereafter. It can be said that CW_min is a value that defines a minimum value of the range of random numbers and CW_max is a value that defines a maximum value of the range of random numbers.

As described above, the access point 11 specifies the values of CW_min and CW_max used when the wireless terminal transmits a request frame using the inquiry frame.

Here, when the number of terminals specified by the inquiry frame is large, if the aforementioned contention window is small, the backoff time becomes shorter and the possibility that frame collision may occur excessively increases. This leads to an extension of the inquiry period due to the frame retransmission. The "inquiry period" mentioned here means a period necessary for the access point 11 to collect a request frame. On the other hand, when the number of terminals specified by the inquiry frame is small, if the aforementioned contention window is large, the backoff time becomes unnecessarily long despite the fact that frame collision is unlikely to occur and the time required to acquire the transmission right is likely to increase. This leads to an extension of the inquiry period and a reduction of system throughput.

Thus, the access point 11 determines the values of CW_min and CW_max according to the number of terminals specified and notifies the determined values of CW_min and CW_max using the inquiry frame.

More specifically, as the number of terminals specified increases, the values of CW_min and CW_max are increased. For example, as shown in FIG. 4, the values of CW_min and CW_max may be determined by providing a table that defines the values of CW_min and CW_max according to the number of terminals and referencing this table according to the number of terminals specified. Alternatively, the values of CW_min and CW_max may be determined by creating functions using the number of terminals as an input variable and the values of CW_min and CW_max as an output variable and giving the number of terminals specified to these functions.

As another method, predetermined initial values of CW_min and CW_max may be increased or decreased according to the number of terminals specified. For example, when the number of terminals specified is a reference value, the initial values are kept as they are and when the number of terminals specified exceeds the reference value, the initial values are increased according to the numerical value that exceeds the initial values or the initial values may be decreased when the number of terminals specified falls below the reference value. Alternatively, assuming the initial values as minimum values, the above method may be changed only so as to increase the initial values according to the number of terminals specified.

As a basic concept when determining the values of CW_min and CW_max, the values may be determined depending on a degree to which the collision rate of frames is preferred to be set. When, for example, the number of terminals is 2 and the contention window size is 4, the frame collision rate may be assumed to be $2/4=0.5$. To set the frame collision rate to 0.5 when the number of terminals is 8, the contention window size may be set to 16. Therefore, when the number of terminals is 2, if CW_min is 4 and when the number of terminals is 8, CW_min may be set to 16. CW_max may also be determined based on a similar concept.

Here, although the values of both CW_min and CW_max are determined, only the value of CW_min may be determined and a predetermined value may be used for CW_max. In this case, the CW_max field of the inquiry frame is unnecessary. Conversely, only the value of CW_max may be determined and a predetermined value may be used for CW_min. In this case, the CW_min field of the inquiry frame is unnecessary. In the case of the former, there is an advantage that the effect of the present embodiment of shortening the inquiry time from initial transmission (not retransmission) and improving throughput is displayed, and in the case of retransmission, the effect of the present embodiment is also displayed from the first retransmission. In the case of the latter (not retransmission), the effect of the present embodiment is not displayed in the initial transmission or while the retransmission count is small, but the effect of the present embodiment is displayed when the retransmission count increases. When both CW_min and CW_max are determined, advantages of both the former and the latter can be obtained.

As described above, for the wireless terminal which has received the inquiry frame 21 transmitted from the access point 11, when the wireless terminal is specified by the inquiry frame, and has uplink transmission data, a request frame is generated and the request frame is transmitted to the access point 11.

FIG. 5 illustrates a format example of the request frame. The request frame includes a frame control (Frame Control) field, a duration (Duration) field, an RA field, a TA field, a data size field, an allowable delay field and an FCS (Frame Check Sequence) field.

In the frame control field, the value of subtype for a request frame is newly defined and the type may be a value that indicates a control frame. However, a possibility that the type may not be a control frame but may be a management frame or data frame is not excluded. A MAC address of the access point 11 may be set in the RA field. A MAC address of the wireless terminal that transmits a request frame may be set in the TA field. A value that indicates a data size of data for which uplink transmission is desired may be set in the data size field. A value of a delay allowed by an application is set in the allowable delay. The data size and the allowable delay can be used by the access point 11 to determine whether or not the wireless terminal is selected as a UL-MU-MIMO transmission target and to determine the transmission data size allowed in UL-MU-MIMO transmission. The data size field and the allowable delay field are not essential and none of them may exist or either one may be inexistent. Furthermore, a preamble of a known patter may be added to the leading side of the request frame. Thus, the access point 11 which has received the request frame may use the preamble to acquire an uplink channel response to each antenna of the access point 11 from the antenna of the wireless terminal. Using this channel response, the data frame UL-MU-MIMO-transmitted from the wireless terminal may be MIMO-demodulated later. The uplink channel response may be acquired using a separate method, for example, by acquiring the uplink channel response before transmission of the inquiry frame.

In the example in FIG. 2, the wireless terminals 1 and 2 are specified in the inquiry frame 21 and the wireless terminal 3 is not specified. The wireless terminals 1 and 2 that have received the inquiry frame 21 have uplink transmission data, and therefore transmit request frames 22 and 24. The request frames 22 and 24 are transmitted according to the access control by CSMA/CA and the backoff time is determined using CW_min and CW_max notified by the inquiry frame 21 in this case. As described above, the value of the contention window (CW) is set to CW_min for both the wireless terminals 1 and 2 first. In the example in FIG. 2, the wireless terminal 1 first acquires a transmission right according to a backoff algorithm and transmits the request frame 22. The access point 11 succeeds in receiving the request frame 22 from the wireless terminal 1 and returns an ACK frame 23 after SIFS from completion of the reception. Next, the wireless terminal 2 acquire a transmission right and transmits the request frame 24. The access point 11 succeeds in receiving the request frame 24 from the wireless terminal 2 and returns an ACK frame 25 after SIFS from completion of the reception. If the access point 11 fails to receive the request frame, it does not return any ACK frame and determines that the wireless terminal that has not received any ACK frame has failed to transmit the request frame. In this case, the wireless terminal updates the value of CW according to the aforementioned algorithm and retransmits the request frame. When retransmission is repeatedly performed, the contention window is widened up to CW_max notified from the access point 11.

When a predetermined condition is established, the access point 11 ends the inquiry period and suspends the reception of the request frame. The access point 11 determines the wireless terminal for which UL-MU-MIMO transmission is allowed and transmits a notification frame 26 which becomes a trigger for UL-MU-MIMO transmission.

As the predetermined condition, a predetermined time (time limit) in advance from completion of the transmission of the inquiry frame 21 may have been reached. Alternatively, either a case where the predetermined time has been reached or a case where request frames are received from all the wireless terminals specified by the inquiry frame 21 may have been established. Other examples will be described later in other embodiments.

Here, regarding the time limit, a field to store a time limit (Time Limit) as shown in FIG. 6 may be provided and the time limit may be notified using this field. The wireless terminal specified by the inquiry frame may not transmit the request frame when it determines that the access point 11 will not be in time for reception by the time limit even when there is uplink transmission data. Alternatively, the wireless terminal may notify the deadline for transmitting the request frame as the time limit using the inquiry frame and when the deadline notified by the frame elapses, the request frame may not be transmitted. In this case, the access point 11 calculates the deadline of the request frame transmission by tracking back from the own time limit and notify the calculated value to the wireless terminal as the time limit.

In the example in FIG. 2, since the access point 11 has received request frames from all the wireless terminals 1 and 2 specified by the inquiry frame, the access point 11 ends the inquiry period and transmits the notification frame 26 which becomes a trigger of UL-MU-MIMO transmission after SIFS from completion of the reception of the last received request frame. Since the time limit is reached, when transmitting a notification frame, the access point 11 may perform carrier sensing according to the access control of CSAM/CA, acquire the transmission right and then transmit the notification frame.

FIG. 7 illustrates an example of a format of the notification frame 26. The notification frame 26 includes a frame control (Frame Control) field, a duration (Duration) field, an RA field, a TA field, a plurality of terminal information (STA Info) fields, and an FCS (Frame Check Sequence) field. In FIG. 7, to distinguish the terminal information field from the terminal information field (STA Info 1 to STA Info n) of the inquiry frame in FIG. 3, the terminal information field is denoted as "STA Info For MIMO 1 to STA Info n For MIMO."

In the frame control field, the value of subtype for a notification frame is newly defined and the type may be a value indicating a control frame. However, a possibility that the type may be set to not a control frame but a management frame or data frame is not excluded. A broadcast address or multicast address may be set in the RA field. The RA field may also be omitted. The MAC address of the access point 11 may be set in the TA field.

The number of terminal information fields set corresponds to the number of terminals for which the access point 11 permits uplink multiuser MIMO transmission. In the inquiry frame in FIG. 3, the same number of terminal information fields as the number of actually permitted terminal candidates are set, whereas in FIG. 7, the number of terminal information fields set corresponds to the number of terminals which are actually permitted, the number of terminal information fields is not always the same for the notification frame and the inquiry frame.

Identification information of the permitted terminals is set in the terminal information field of the notification frame. The identification information may be a MAC address of the terminal or association ID (AID) or an ID, which is unique among terminals. Furthermore, parameter information used by the wireless terminal during uplink multiuser MIMO transmission, data length by which transmission is permitted and information to be individually notified to the terminal to be permitted may be set in the terminal information field. As the parameter information, MCS (modulation and coding scheme) that defines a transmission rate and information on a pattern of a preamble added to the head of the data frame transmitted by the wireless terminal via uplink (preamble for estimating a channel response) (in the case of a configuration in which the preamble is added to the data frame) may be notified. Furthermore, when the wireless terminal has a plurality of antennas and can transmit a plurality of streams, the number of streams permitted for transmission may be notified. Note that a common information field may also be provided in the notification frame as shown in FIG. 8. Information to be commonly notified to a permitted terminal group is set in the common information field. For example, the transmission data size permitted for each wireless terminal may be set in this field as a common value. When data transmitted by the wireless terminal is smaller than the transmission data size specified in the terminal information field or common information field, padding data may be added or nothing may be transmitted for a portion smaller than the size.

The wireless terminals 1 and 2 which receive the notification frame 26 from the access point 11 and for which uplink transmission is permitted in the notification frame 26, transmit data frames 27 and 28 including uplink transmission data to the access point 11 after SIFS from completion of the reception of the notification frame 26. This synchronizes transmission timing of data frames transmitted from the respective wireless terminals 1 and 2 and causes frame transmission (UL-MU-MIMO transmission) to be executed in a spatial multiplexing mode from the respective wireless terminals 1 and 2. In the example in FIG. 2, since the wireless terminals 1 and 2 are specified by the notification frame 26 as permitted terminals, the wireless terminals 1 and 2 transmit the data frames 27 and 28 after SIFS from completion of the reception of the notification frame 26 respectively. Note that as described above, a preamble for estimating a channel response, more specifically, preambles having patterns orthogonal to each other between the wireless terminals may be added on the leading side of the data frames transmitted by the respective wireless terminals 1 and 2 for which uplink transmission is permitted. Using the preambles, the access point 11 may acquire uplink channel information between the respective antennas of the respective wireless terminals 1 and 2 and the antenna of the access point 11 and perform MIMO demodulation on the frame parts after the preambles using the channel information. In order to use preambles having patterns orthogonal to each other between the wireless terminals 1 and 2, information on preamble patterns used by the respective wireless terminals may be set in the terminal information field of the notification frame 26 or the preamble patterns used by the wireless terminals may be notified to the wireless terminals using another method in advance.

Upon receiving the data frames from the wireless terminals 1 and 2, the access point 11 divides the data frames into the data frames 27 and 28 of the respective wireless terminals through MIMO demodulation and checks for each data frame whether or not the data frames can be received normally based on FCS information. The access point 11 generates acknowledgment response information indicating the check result as to whether or not the data frames have been received normally and generate a BlockACK frame 29 including the acknowledgment response information of each wireless terminal. The access point 11 transmits the Block-ACK frame 29 to the wireless terminals 1 and 2 to which the data frames have been transmitted. The wireless terminals 1 and 2 detect acknowledgment response information of the wireless terminals from the BlockACK frame and grasp whether or not transmission of the data frames has been successful. Here, the wireless terminals 1 and 2 transmit the BlockACK frame, but may also return an ACK frame to each terminal to which the data frame has been transmitted and which succeeds in reception. In this case, it is determined that the terminal which has received the ACK frame has succeeded in transmission of the data frame and that the terminal which has not received the ACK frame has failed in transmission of the data frame. Alternatively, it is also possible to transmit a super-frame which puts together a plurality of frames including check results of the respective wireless terminals.

In the inquiry frame in FIG. 3, CW_min and CW_max are set in the respective fields, but these values may be set in the respective terminal information fields as an example of modification. In this case, the CW_min field and the CW_max field may be omitted. Furthermore, when the values of CW_min and CW_max are set in the respective terminal information fields, the values of CW_min and CW_max may be changed for each wireless terminal. For example, when it is known that there is a wireless terminal to which data needs to be transmitted urgently, the value of CW_min of the wireless terminal may be smaller than the values of other wireless terminals. Thus, it is possible to relatively shorten the backoff time of the wireless terminal having urgent data and increase the possibility that a request frame may be reliably transmitted.

In the aforementioned embodiment, the wireless terminal transmits a request frame only when it has uplink transmission data. Another method may be that the wireless terminal transmits a request frame regardless of whether or not to have uplink transmission data. In this case, the request frame may be provided with a field to set information for specifying whether or not to have uplink transmission data and information on the presence or absence of uplink transmission data may be set in the field. FIG. 9 illustrates an example of a request frame provided with a field to set a transmission data presence/absence bit. The access point 11 may select a wireless terminal to perform UL-MU-MIMO transmission from among wireless terminals including uplink transmission data out of the wireless terminals which have returned request frames.

In the aforementioned embodiment, identification information of a wireless terminal selected as an inquiry destination is set in each terminal information field of the inquiry frame to thereby specify the wireless terminal, but there is also a method of specifying a group of wireless terminals instead of specifying individual wireless terminals. In this case, a plurality of groups of wireless terminals may be generated in advance and identification information (group ID) of the selected group as the inquiry destination may be set in the group ID field of the inquiry frame. In this case, the access point 11 is assumed to notify information regarding to which group each wireless terminal belongs to each wireless terminal in advance using a management frame or the like. FIG. 10 shows a format example of the inquiry frame when a group ID is notified. The terminal information field may be omitted when the wireless terminal has no information to be individually notified other than the identification information and FIG. 10 omits the terminal information field. The method whereby the access point 11 generates a group by combining wireless terminals may be optional and, for example, when a channel response (channel matrix) with each wireless terminal is grasped in advance, wireless terminals with a small spatial correlation (with less interference) may be put together into an identical group. One and the same wireless terminal may belong to a plurality of groups. By specifying a group ID in this way, it is possible to shorten the length of an inquiry frame compared to a case where identification information of individual wireless terminals is specified. When a group of wireless terminals is generated in advance, the number of terminals to be inquired in each group is determined, and therefore the access point 11 may notify CW_min and CW_max corresponding to the number of terminals when notifying the group in advance. In this case, the CW_min field and the CW_max field are unnecessary in the inquiry frame.

FIG. 11 is a functional block diagram of a wireless communication device incorporated in the access point 11. As described above, the access point 11 is connected at least to the network to which the wireless terminals belong, and can further be connected to another network different from the former network. FIG. 11 illustrates a configuration of a wireless communication device connected to the network to which the wireless terminals belong.

The wireless communication device in the access point 11 includes a controller 101, a transmitter 102, a receiver 103, antennas 12A, 12B, 12C and 12D, and a buffer 104. The controller 101 corresponds to controlling circuitry or a baseband integrated circuit which controls communication with the wireless terminals, and the transmitter 102 and the receiver 103 form a wireless communicator or an RF integrated circuit which transmits and receives frames via the antenna as an example. A process of the controller 101, and all or a part of a digital region process of the transmitter 102 and the receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and the receiver 103.

The buffer 104 is a storage for transferring a data frame between an upper layer and the controller 101. The upper layer may store the frame received from another network (for example, data stored in the payload part of the MAC frame) in the buffer 104 for relaying to the network in the terminal side, or takes in, from the controller 101, data of the frame received from the network in the terminal side to pass it to the upper layer. The upper layer may perform an upper communication process than a MAC layer such as a TCP/IP or a UDP/IP. The upper layer may carry out a process of an application layer for processing data. An operation of the upper layer may be performed by software (program) processing by a processor such as a CPU, or may be performed by hardware, or may be performed by the both of the software and the hardware.

The controller 101 mainly performs a process of the MAC layer. The controller 101 manages an access to a wireless channel and controls to transmit a frame at a desired timing. The controller 101 transmits and receives the frames via the transmitter 102 and the receiver 103 to control the communication with the wireless terminals. The controller 101 may also control so as to periodically transmit a beacon frame. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

Upon receiving an association request from a wireless terminal, the controller 101 establishes a wireless link with the wireless terminal via a process of authentication or the like if necessary. The controller 101 manages information on the wireless terminal with which a wireless link has been established using an internal or external accessible storage device. The controller 101 determines to make an inquiry about UL-MU-MIMO transmission at any given trigger and generates an inquiry frame. The controller 101 selects a wireless terminal to be inquired from among wireless terminals being connected to the access point 11. The controller 101 determines values of CW_min and CW_max according to the number of selected terminals. By setting identification information of the selected wireless terminals in their respective terminal information fields and setting the values of CW_min and CW_max in the respective fields, the controller 101 generates inquiry frames. Here, a group may be selected instead of selecting individual wireless terminals. In this case, it is assumed that the controller 101 generates a group by combining wireless terminals and notify information regarding to which group each terminal belongs to each wireless terminal using a management frame or the like in advance. In this case, since the number of terminals to be inquired in each group is determined when a group of wireless terminals is generated, CW_min and CW_max corresponding to the number of terminals may be associated with a group ID and notified when the group is notified in advance. When selecting a group, the controller 101 may provide a group identification information field in the inquiry frame and set identification information (group ID) of the selected group in the field. In this case, the terminal information field may be omitted when there is no information to be individually notified other than the identification information in the wireless terminal. Furthermore, the CW_min field and CW_max field are unnecessary in the inquiry frame when CW_min and CW_max corresponding to the number of terminals are notified when the group is notified.

The controller 101 transmits the generated inquiry frame from the transmitter 102 according to the access control of CSMA/CA. For example, the controller 101 performs carrier sensing for DIFS and a subsequent backoff time determined using a random number and outputs, if a transmission right can be acquired, an inquiry frame to the transmitter 102.

The transmitter 102 performs processing in a desired physical layer such as addition of a physical header to the frame inputted from the controller 101 and modulation processing. Furthermore, the transmitter 102 performs DA conversion and filter processing of extracting a signal component in a desired band and frequency conversion on the frame after physical layer processing. The transmitter 102 amplifies the frequency-converted signal and radiates the amplified signal into space as a radio wave from one antenna or a plurality of antennas. Note that one transmitter is provided in the example in FIG. 11, but a plurality of transmitters may be provided and one antenna may be connected to each transmitter.

The controller 101 manages carrier sensing information via the receiver 103. To be more specific, the controller 101 may include both physical carrier sensing information relating to whether a medium (CCA) inputted from the receiver 103 is busy or idle and virtual carrier sensing information based on a medium reservation time described in the reception frame. If any one item of the carrier sensing information indicates a busy state, the medium is assumed to be busy and transmission of signals in the busy state is prohibited.

A signal received by each antenna is amplified at the receiver 103, frequency-converted (down-converted) and subjected to filter processing. The signal subjected to the filter processing is converted to a digital signal through AD conversion, subjected to processing in a physical layer such as demodulation and the frame is inputted to the controller 101. The controller 101 analyzes the frame and performs operation corresponding to the analysis result. Note that in the case of a normal transmission frame (request frame or the like) other than UL-MU-MIMO transmission, a signal received by any one antenna determined optionally or in advance out of a plurality of antennas may be processed or signals received by the respective antennas using a diversity technique may be processed to acquire a frame. Alternatively, the received signal may be processed using another method. Upon receiving a request frame, the controller 101 grasps that the wireless terminal which has transmitted the request frame includes uplink transmission data. The controller 101 selects a wireless terminal to perform UL-MU-MIMO transmission based on the request frame, generates a notification frame that specifies the selected wireless terminal and transmits the notification frame. When a UL-MU-MIMO-transmitted signal is received, the receiver 103 performs MIMO demodulation based on the previously acquired channel information with respect to each wireless terminal and thereby separates the frame into data frames for each wireless terminal. In the example in FIG. 11, one receiver is provided, but a plurality of receivers may be arranged and one antenna may be connected commonly with the corresponding transmitter for each receiver.

The controller 101 may access a storage for storing the information to be transmitted via the frame to the terminal or the information received from the terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and the transmitter 102 is an example, and another form may be used. For example, the controller 101 may perform the process until the digital region process and the DA conversion, and the transmitter 102 may perform the process subsequent to the DA conversion. As for the isolation of the processes of the controller 101 and the receiver 103, similarly, the receiver 103 may perform the process before the AD conversion and the controller 101 may perform the digital region process including processes following the AD conversion. As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

FIG. 12 is a functional block diagram of the wireless communication device incorporated in the wireless terminal 1. Any one of the respective wireless communications devices incorporated in the respective wireless terminals 2 to 6 has same configuration as that of the wireless terminal 1 and explanation therefor is omitted.

The wireless communication device of FIG. 12 includes a controller 201, a transmitter 202, a receiver 203, an antenna 1A, and a buffer 204. The controller 201 corresponds to controlling circuitry or a baseband integrated circuit which controls communication with the access point 11, and the transmitter 202 and the receiver 203 form a wireless communicator or an RF integrated circuit which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of the software and the hardware. The terminal may include a processor performing the process of the controller 201, all or a part of the transmitter 202 and the receiver 2z03.

The buffer 204 is a storage for transferring data between an upper layer and the controller 201. The upper layer generates data to be transmitted to other terminals, the access point 11, or a device on another network such as a server and stores the generated frames in the buffer 204, or takes in, via the buffer 204, data of the frame received from the network. The upper layer may perform an upper communication process than a MAC layer such as a TCP/IP or a UDP/IP. The TCP/IP or the UDP/IP may be performed in the controller 201 and the upper layer may perform a process of an application layer of processing data. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames via the transmitter 202 and the receiver 203 to and from the access point 11 to control the communication with the access point 11. The controller 201 receives, for example, a beacon frame periodically transmitted from the access point 11 via the antenna 1A and the receiver 203. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

As an example, a controller 201 receives a beacon frame, sends an association request to the access point 11, and establishes a wireless link with the access point 11 after undergoing a process of authentication or the like if necessary. Upon receiving an inquiry frame from the access point 11, the controller 201 checks whether or not identification information of the wireless terminal is set in any one of the respective terminal information fields. When the identification information of the wireless terminal is set, the controller 201 determines that the terminal is selected as a candidate terminal for UL-MU-MIMO transmission, confirms whether or not the buffer includes non-transmitted data, and thereby confirms whether or not there is uplink transmission data. Furthermore, the controller 201 specifies the values of CW_min and CW_max stored in the inquiry frame. The controller 201 generates a request frame according to the confirmation result and transmits the request frame according to the access control of CSMA/CA via a transmitter 202 and the antenna 1A. When no ACK frame in response to the request frame is returned, the request frame is retransmitted. To determine the backoff time when performing transmission and retransmission of the request frame, the above-specified CW_min (and CW_max) is used. Upon receiving a frame such as management frame that notifies a group from the access point 11, the controller 201 grasps a group ID of the group to which the wireless terminal belongs. When a group is specified instead of identification information of each terminal in the inquiry frame, it is determined whether or not the specified group matches the group to which the wireless terminal belongs and when the specified group matches the group, the controller 201 performs a process similar to that in the case where the aforementioned wireless terminal is specified. In the frame which notifies the group to which the wireless terminal belongs, if CW_min and CW_max corresponding to the group are also notified, the controller 201 may store the values of CW_min and CW_max notified in the frame and transmit and retransmit a request frame when receiving the inquiry frame that specifies the group to which the wireless terminal belongs using the stored values of CW_min and CW_max.

The transmitter 202 performs processing in a desired physical layer such as addition of a physical header to the frame inputted from the controller 201 and modulation processing or the like. The transmitter 202 performs DA conversion, filter processing of extracting a signal component in a desired band, frequency conversion (up-conversion) on the frame subjected to processing in the physical layer. The transmitter 202 amplifies the frequency-converted signal and emits the amplified signal into space from the antenna as a radio wave.

A signal received by an antenna 1A is processed by a receiver 203. For example, a signal of an inquiry frame or a notification frame is received from the access point 11 and processed in the receiver 203. The received signal is amplified, frequency-converted (down-converted) in the receiver 203 and a desired band component is extracted through filtering processing. The extracted signal is further converted to a digital signal by AD conversion, subjected to processing in a physical layer such as demodulation and the frame is inputted to the controller 201. The controller 201 analyzes the inputted frame and performs operation according to the analysis result. For example, upon receiving an inquiry frame, the controller 201 performs the aforementioned operation, generates, when uplink transmission data exists, a request frame and transmits the request frame. Upon detecting a notification frame, the controller 201 confirms with the notification frame whether or not the wireless terminal is specified as a UL-MU-MIMO transmission terminal. To be more specific, the controller 201 confirms in which of the terminal information fields, the identification information of the wireless terminal is set and when the identification information is set, the controller 201 determines that the wireless terminal is specified. In this case, the controller 201 reads data from a buffer, constructs a data frame and transmits the data frame via the transmitter 202 and the antenna 1A. The data frame is transmitted in a predetermined time such as after SIFS from completion of reception of the notification frame. Thus, the data frame is transmitted at the same timing from each wireless terminal that receives a notification frame and UL-MU-MIMO transmission (spatial multiplexing transmission) is performed.

The controller 201 may access a storage device that stores either information to be notified to the access point or the information notified from the access point or both of these pieces of information and read the information. The storage device may be an internal memory device, an external memory device, a volatile memory device, or a non-volatile memory. Also, the storage devices such as an SSD and a hard disk may be used in place of the memory device.

The above described isolation of the processes of the controller 201 and transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion. As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 13:
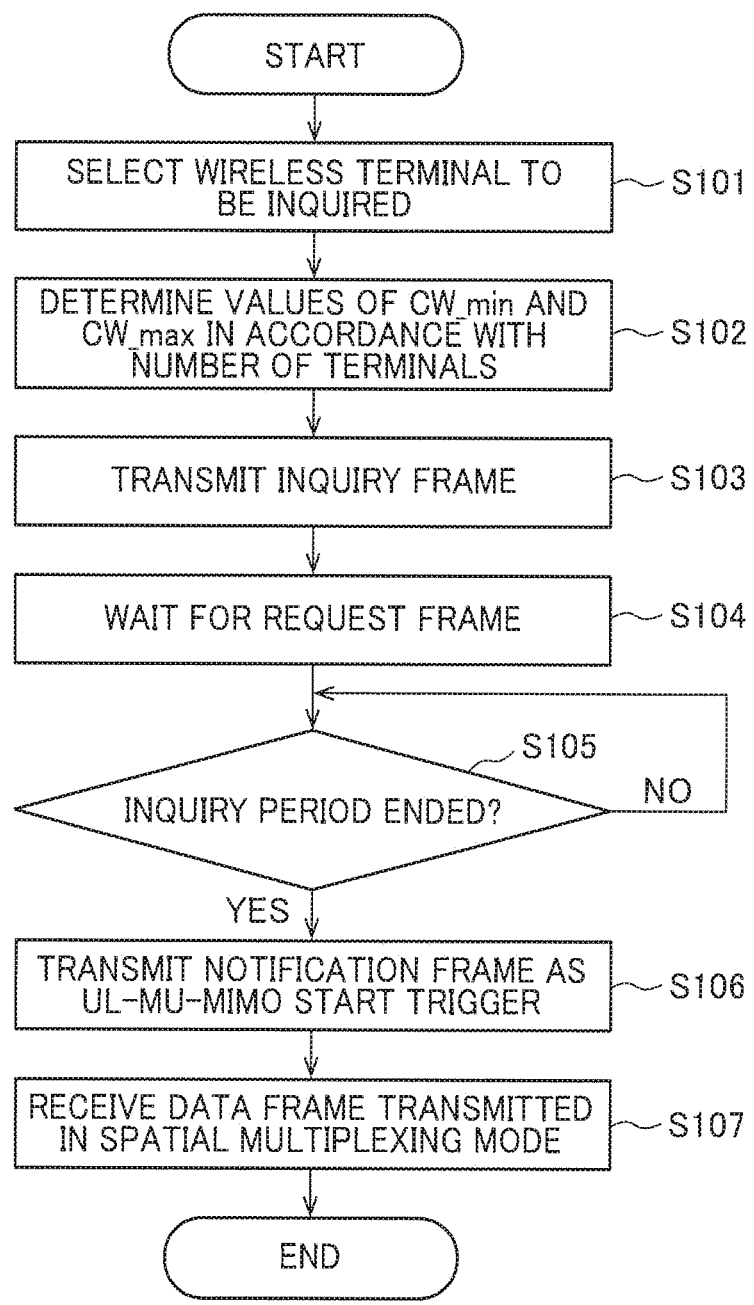
FIG. 13 is a flowchart of operation of the access point according to the first embodiment.

FIG. 13 is a flowchart of operation by the access point according to the first embodiment.

The access point 11 determines to perform UL-MU-MIMO transmission and selects wireless terminals to be candidates (S101). The access point 11 determines CW_min and CW_max to be used for when the wireless terminals transmit (and retransmit) a request frame according to the number of selected wireless terminals. The access point sets identification information of the selected wireless terminals in the respective terminal information fields of the terminals, sets the determined CW_min and CW_max in the respective fields and thereby generates an inquiry frame. The access point transmits the inquiry frame according to the access control of CSMA/CA (S103).

During an inquiry period, the access point waits for a request frame from the wireless terminal including uplink transmission data (S104). In the case of a configuration in which a request frame is transmitted regardless of the presence or absence of the uplink transmission data, the access point waits for a request frame from each wireless terminal notified in the inquiry frame. In a case where a predetermined period has elapsed or a case where request frames are received from all the wireless terminals specified in the inquiry frame, the access point determines whether or not the predetermined condition is established (S105) and ends, when the condition is established, the inquiry period and determines a wireless terminal that performs UL-MU-MIMO transmission. The access point generates a notification frame which becomes a trigger to start UL-MU-MIMO and transmits the generated notification frame (S106). The access point receives a data frame signal transmitted from each wireless terminal a predetermined time (such as SIFS) after completion of transmission of the notification frame, performs MIMO demodulation and thereby acquires a data frame from each wireless terminal (S107).

Figure 14:
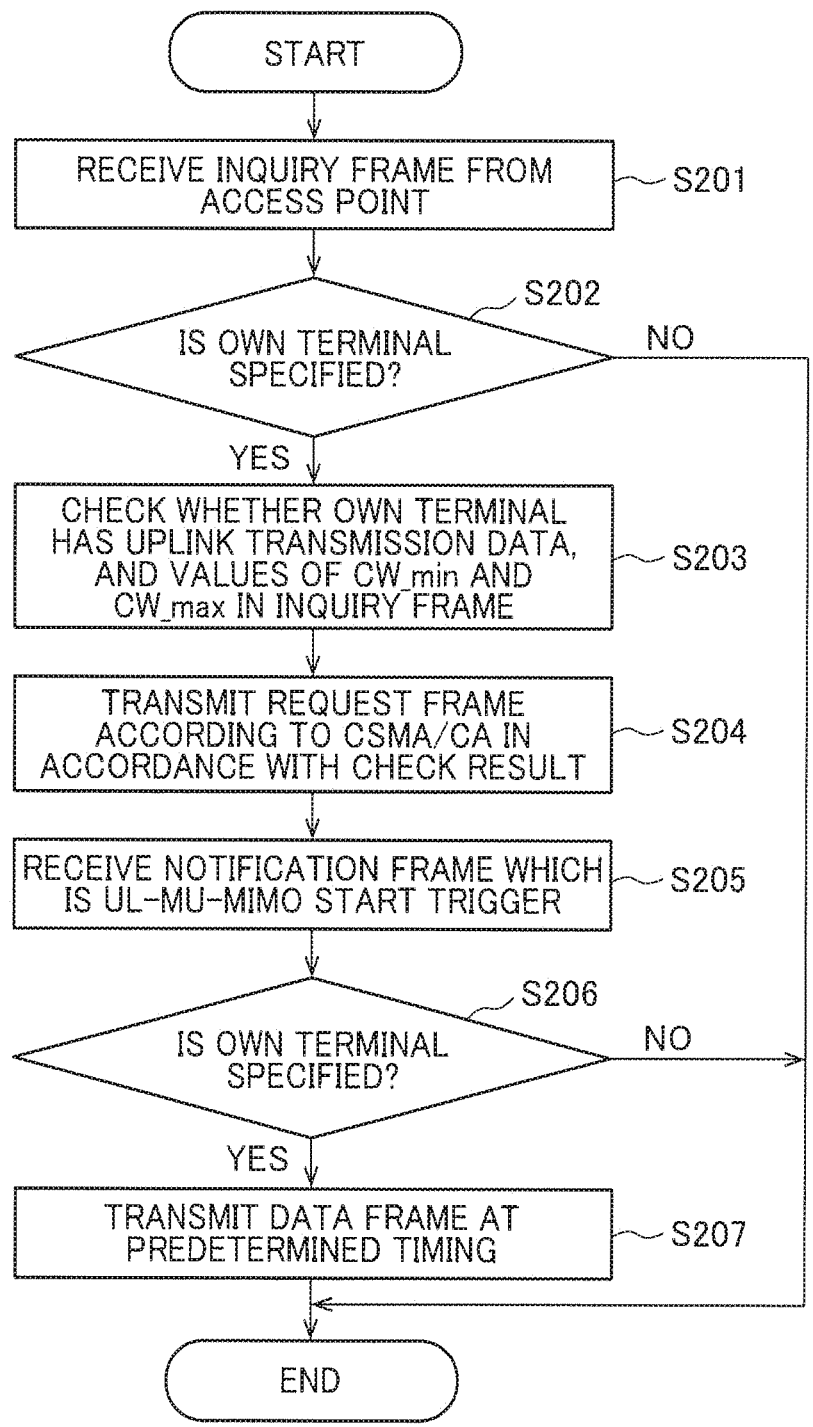
FIG. 14 is a flowchart illustrating operation of the wireless terminal according to the first embodiment.

FIG. 14 is a flowchart illustrating operation of the wireless terminal according to the present embodiment.

Upon receiving an inquiry frame from the access point 11 (S201), the wireless terminal checks with the inquiry frame whether or not the wireless terminal is specified (S202). When the wireless terminal is specified, the wireless terminal checks whether the wireless terminal has uplink transmission data and checks the values of CW_min and CW_max in the inquiry frame (S203). The wireless terminal transmits a request frame to the access point in accordance with the check result according to the access control of CSMA/CA (S204). In the case of a system configuration in which a request frame is transmitted only when the wireless terminal has uplink transmission data, the request frame is transmitted only when the wireless terminal has uplink transmission data and transmission of the request frame is unnecessary when the wireless terminal has no such data. Note that the values of CW_min and CW_max in the inquiry frame may be confirmed only when transmission of the request frame is necessary. For transmission and retransmission of the request frame, a backoff time is determined according to the CW_min and CW_max notified in the inquiry frame.

When the wireless terminal has uplink transmission data, if the wireless terminal transmits a request frame to the access point, the wireless terminal waits for a subsequent notification frame transmitted from the access point. Upon receiving the notification frame (step S205), the wireless terminal checks whether or not the wireless terminal is specified as a terminal for UL-MU-MIMO transmission in the notification frame (S206). When the wireless terminal is not specified, the wireless terminal determines not to perform any UL-MU-MIMO transmission this time. When the wireless terminal is specified, the wireless terminal transmits a data frame a predetermined time (such as SIFS) after completion of reception of the notification frame (S207). Since data frames are transmitted at the same timing from other wireless terminals specified by the notification frame, UL-MU-MIMO transmission (spatial multiplexing transmission) is thereby realized.

As described so far, according to the present embodiment, the access point changes the backoff parameters of CSMA/CA (at least one of CW_min and CW_max) according to the number of terminals to be inquired of UL-MU-MIMO. When the number of terminals to be inquired is small, it is possible to reduce the backoff period by reducing at least one of CW_min and CW_max and thereby shorten the inquiry period. It is thereby possible to prevent overhead from increasing excessively. On the other hand, when the number of terminals to be inquired is large, it is possible to prevent the probability of frame collision from increasing by increasing at least one of values of CW_min and CW_max and thereby increasing the backoff period. As a result, it is possible to prevent an excessive increase in the inquiry period caused by retransmission.

Second Embodiment

In the first embodiment, upon successfully receiving a request frame transmitted by a wireless terminal, the access point returns an ACK frame, but the system may be configured so as to prevent the access point from transmitting any ACK frame regardless of success or failure of the reception of a request frame. Thus, although reachability of the request frame transmitted by the wireless terminal can no longer be guaranteed, it is possible to shorten the inquiry period.

Figure 15:
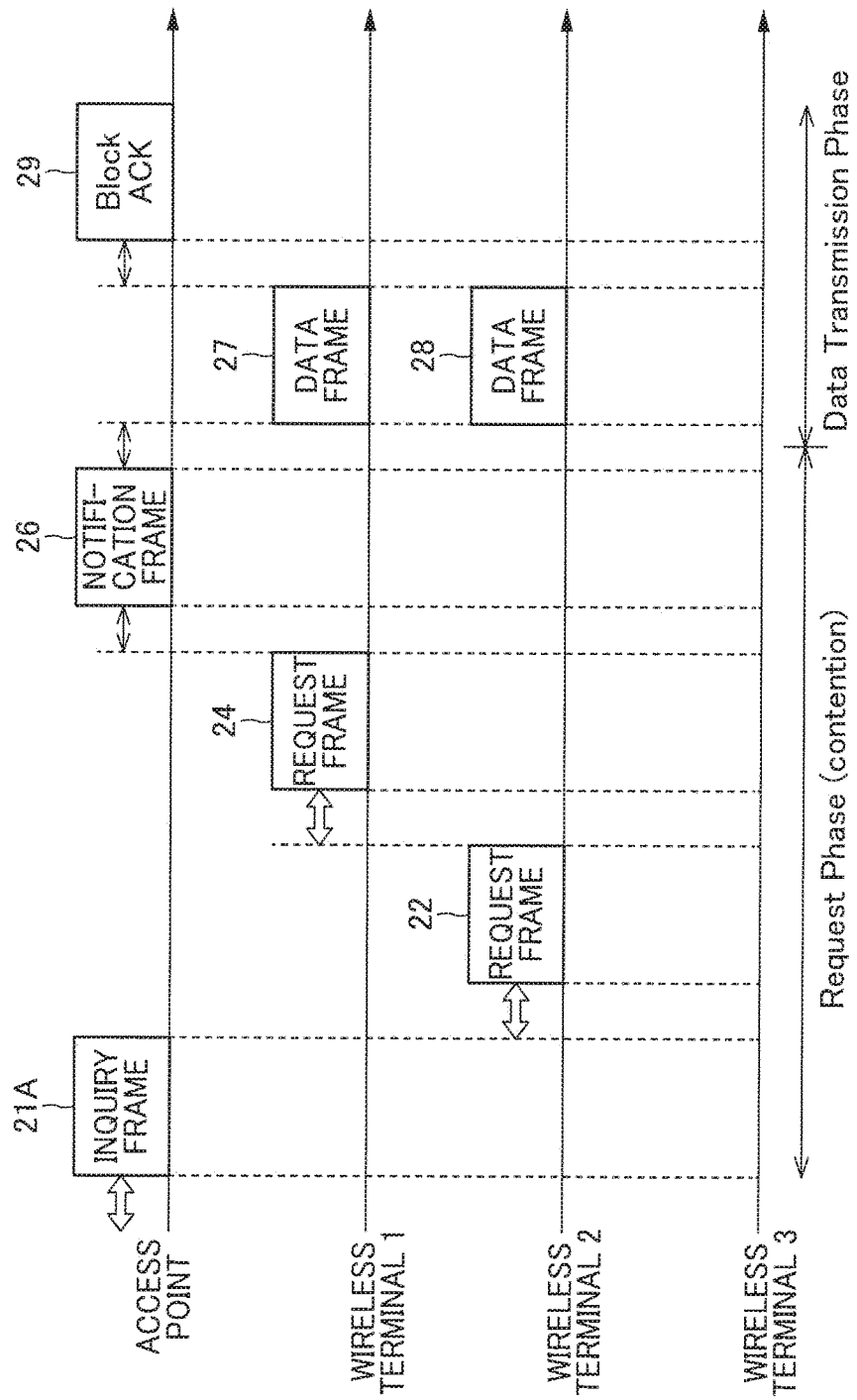
FIG. 15 is a diagram illustrating an example of an operation sequence according to a second embodiment.

FIG. 15 illustrates an example of an operation sequence according to a second embodiment. When the access point determines to perform UL-MU-MIMO transmission, it transmits an inquiry frame 21A. FIG. 16 illustrates a format example of the inquiry frame 21A. Unlike the first embodiment, the inquiry frame 21A need not include the CW_max field. This is because the access point does not return any ACK frame in response to the request frame transmitted by the wireless terminal, and so the wireless terminal cannot determine success or failure of frame transmission and does not perform any frame retransmission. That is, in the present embodiment, the wireless terminal determines the backoff period using the CW_min specified by the inquiry frame only at the first request frame transmission.

As described so far, since the present embodiment adopts a system configuration in which no ACK frame is returned in response to a request frame, it is possible to shorten the inquiry period and thereby improve system throughput.

Third Embodiment

The first embodiment has described, as conditions for ending the inquiry period, a case where a request frame is received from a wireless terminal specified by the inquiry frame and a case where a time limit has elapsed.

As another example, upon receiving request frames from a predetermined number of wireless terminals, the access point may end the inquiry period. The "predetermined number of wireless terminals" is a value equal to or less than the number of wireless terminals specified by the inquiry frame. For example, when the access point specifies the number of wireless terminals equal to or greater than a maximum allowable multiplex number using the inquiry frame, and the number of request frames received reaches the maximum allowable multiplex number, the inquiry period may be ended. For example, a case may be considered where although the access point originally plans to multiplex two wireless terminals but since it is uncertain whether or not it is possible to receive responses (request frames) from the wireless terminals, the access point may inquire four wireless terminals, that is, more than original ones and end the inquiry period when the access point can receive request frames from the two wireless terminals.

As described so far, according to the present embodiment, it is possible to increase the possibility that the access point will start UL-MU-MIMO transmission earlier with a desired multiplex number.

Fourth Embodiment

In the first to third embodiments, the access point specifies a wireless terminal from which a response is requested using an inquiry frame, but when all wireless terminals connected to the access point (wireless terminals with which wireless links are established) are specified, the wireless terminals may not be explicitly specified using inquiry frames.

FIG. 17 illustrates a format example of an inquiry frame according to the fourth embodiment. No terminal information field exists in this frame format. The access point may determine the values of CW_min and CW_max (or one of these values) based on the number of wireless terminals which are connected to (which have established wireless links with) the access point. Alternatively, the access point may determine the values of CW_min and CW_max based on the number of wireless terminals that support UL-MU-MIMO transmission out of wireless terminals which have established connection with the access point. When there are wireless terminals which have transitted into a low power consumption state such as a power save mode, the number of wireless terminals may be counted by excluding such wireless terminals. When there is information which should be commonly notified to the respective wireless terminals, the aforementioned common information field may be added and the information to be commonly notified may be set in the field. In addition, when preambles which are orthogonal to each other are added to the leading side of the request frame, information of the preamble pattern may be notified using this common information field.

A wireless terminal which has received a frame from the access point grasps that the frame is an inquiry frame relating to UL-MU-MIMO transmission based on the type of the frame control field and the value of subtype. When the wireless terminal includes uplink transmission data, the wireless terminal returns a response (request frame). Alternatively, the wireless terminal returns a response (request frame) including information on the presence or absence of uplink transmission data regardless of whether to have the uplink transmission data. Which of these methods should be used to return a request frame is determined in advance by the specification or system. Alternatively, a field to identify which method is used to return a request frame may be added to the inquiry frame separately to determine the method from the field. Note that when a wireless terminal which does not support UL-MU-MIMO transmission receives an inquiry frame, the inquiry frame may be ignored and no request frame may be returned.

In the present embodiment, regarding an end of the inquiry period, the access point may end the inquiry period when the access point receives request frames from a predetermined number of wireless terminals or may end the inquiry period when a time limit has elapsed. Alternatively, the inquiry period may be ended when any one of these conditions is established.

As described so far, according to the present embodiment, since the terminal information field can be omitted from the inquiry frame, the frame length of the inquiry frame can be shorted.

Fifth Embodiment

In the first to fourth embodiments, the access point determines the values of CW_min and CW_max and notifies these values using an inquiry frame, but the wireless terminal side may calculate parameter information (values of CW_min and CW_max) relating to the backoff time. In this case, the CW_min and CW_max fields may be omitted from the inquiry frame. FIG. 18 shows a frame format example of an inquiry frame from which the CW_min and CW_max fields are omitted.

The wireless terminal which has received the inquiry frame grasps the number of wireless terminals specified by the inquiry frame and determines the values of CW_min and CW_max to be applied in the case of transmission of the request frame according to the grasped number of wireless terminals. To determine CW_min and CW_max, the same method used by the access point described in the first embodiment may be used.

As the method of grasping the number of wireless terminals specified by the inquiry frame, the number of items of identification information of wireless terminals stored in the inquiry frame (number of terminal information fields) may be counted. Alternatively, the inquiry frame may be provided with a field in which the number of wireless terminals to be specified is set and the number of wireless terminals may be determined from the field. Furthermore, when group IDs are set in the inquiry frame, the number of wireless terminals may be specified based on information that associates the group ID of the group with a list of terminals belonging to the group (or the number of terminals belonging to the group). Information on the correspondence between the group ID and the list of terminals may be acquired in advance from the access point. The identification information of wireless terminals, the number of wireless terminals and group IDs or the like stored in the frame are examples of information to specify the backoff time (more specifically, values of CW_min and CW_max) when carrying out carrier sensing of CSMA/CA as described in the present paragraph.

Figure 19:
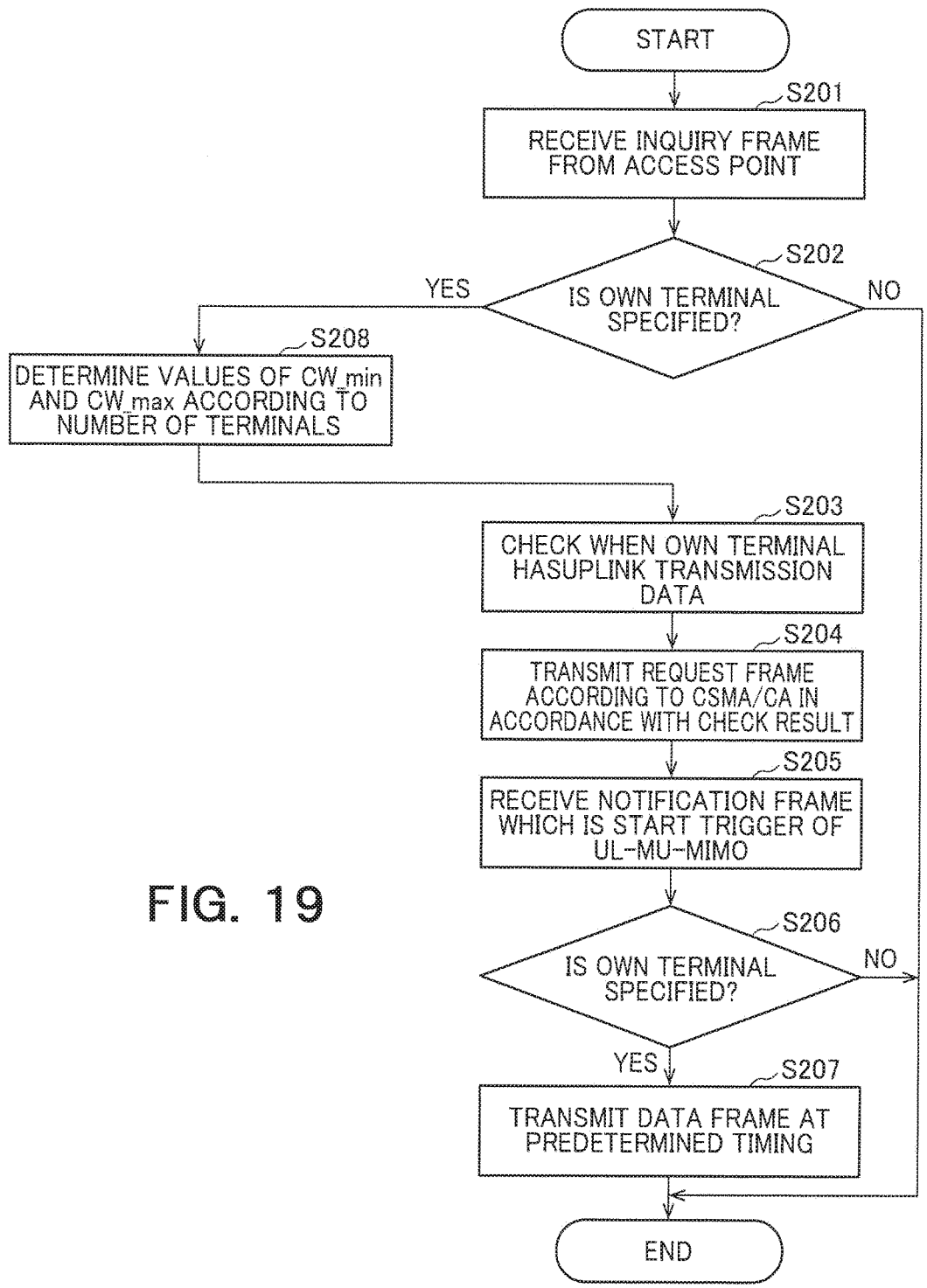
FIG. 19 is a flowchart illustrating operation of a wireless terminal according to a fifth embodiment.

FIG. 19 is a flowchart illustrating operation of a wireless terminal according to a fifth embodiment. Step S208 is added to the flowchart in FIG. 14. The following description will focus on differences from FIG. 14.

When the wireless terminal is specified in the inquiry frame (YES in step S202), the wireless terminal calculates the number of terminals specified in the inquiry frame (the total number of the wireless terminal and other devices). For example, by reading identification information of the respective wireless terminals from the respective terminal information fields of the inquiry frame and counting the number of items of the read identification information, the number of candidate terminals is specified. If the number of terminal information fields is countable, the number of fields may be counted. Alternatively, if the inquiry frame includes a field to store the number of candidate terminals, the number of candidate terminals may be specified from the field. The wireless terminal determines the values of CW_min and CW_max based on the number of candidate terminals using a method similar to the method used by the access point for calculation in the first embodiment. After determining the values of CW_min and CW_max, the flow proceeds to step S203 and the flow thereafter is the same as that in FIG. 15. Note that the order of steps of the present flowchart is not limited to that shown in FIG. 15, but the order can be changed as long as the desired operation can be obtained. For example, the order of steps S203 and S208 may be reversed.

As described so far, according to the present embodiment, by determining parameter information of the backoff time (values of CW_min and CW_max) on the wireless terminal side, the configuration of the access point can be simplified. Moreover, the frame length of an inquiry frame transmitted from the access point can be shortened.

Sixth Embodiment

In the embodiments described so far, the trigger for transmission of an inquiry frame is a judgment by the access point, whereas in the present embodiment, the access point transmits to other wireless terminals, inquiry frames as to whether to have uplink transmission data by assuming as a trigger, the fact that the access point has received a request frame from any one given wireless terminal. Hereinafter, the present embodiment will be described as an expansion of the second embodiment (see FIG. 15), but the first and third to fifth embodiments are likewise expandable.

Figure 20:
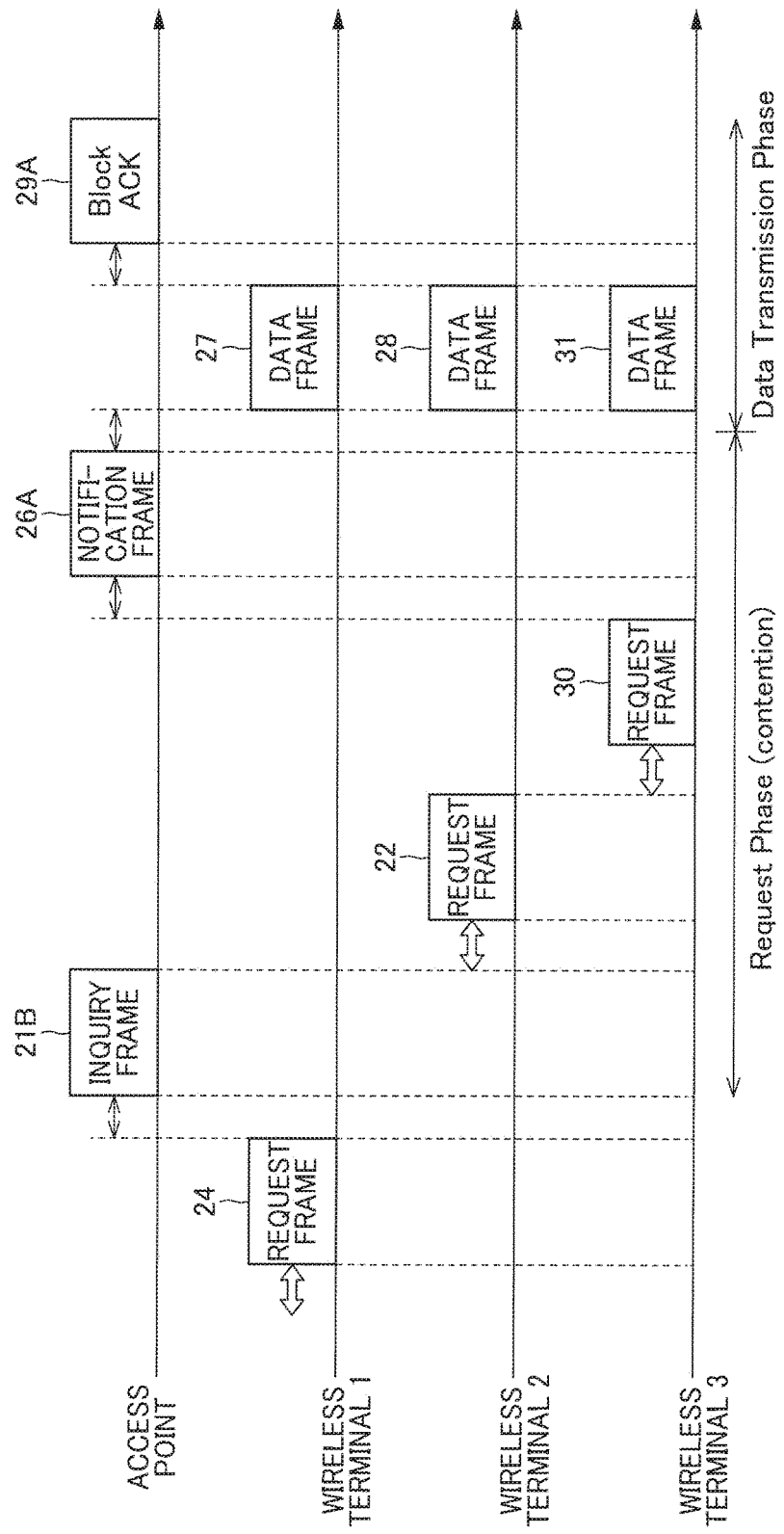
FIG. 20 is a diagram illustrating an example of an operation sequence according to a sixth embodiment.

FIG. 20 is a diagram illustrating an example of an operation sequence between an access point and wireless terminals according to a sixth embodiment.

A wireless terminal 1 includes uplink transmission data and transmits a request frame 24 for requesting transmission of the data in UL-MU-MIMO transmission. The format of this request frame may be the same as that of the embodiments described so far (see FIG. 5) or may be defined separately. To transmit the request frame 24, the wireless terminal 1 performs carrier sensing between DIFS and a randomly determined backoff time, and acquires a transmission right. The backoff time at this time may be a backoff time determined using a conventional method. That is, aside from CW_min and CW_max notified by the inquiry frame, the backoff time is determined by CW_min and CW_max determined by the specification or system in advance. Upon receiving the request frame 24 from the wireless terminal 1, the access point 11 transmits an inquiry frame 21B SIFS later.

In the inquiry frame 21B, at least CW_min is notified as described in the second embodiment, but CW_min at this time may be determined according to the number of wireless terminals to be inquired except the wireless terminal 1. CW_max may also be determined in the like fashion. In the inquiry frame 21B, the terminal information field of the wireless terminal 1 that has transmitted the request frame 24 which becomes a trigger is unnecessary. In the example in FIG. 20, a wireless terminal 2 and a wireless terminal 3 are selected as wireless terminals to be inquired and only terminal information fields of the wireless terminals 2 and 3 are sufficient. In response to the inquiry frame 21B, the wireless terminals 2 and 3 use request frames 22 and 23 respectively to respond to the access point 11. The formats of the request frames 22 and 23 may be the same as or different from that of the request frame 24 transmitted by the wireless terminal 1.

The access point 11 selects the wireless terminal 1 which is the sender of the request frame 24 which becomes a trigger and the wireless terminals 2 and 3 which are the senders of the response frames (request frames) 22 and 30 in response to the inquiry frame 21B as terminals that perform UL-MU-_MIMO transmission, and transmits a notification frame 26A that specifies these wireless terminals 1 to 3. The wireless terminals 1 to 3 that receive the notification frame 26A confirm that the wireless terminal is specified in the notification frame 26A and transmit data frames 27, 28 and 31 respectively after SIFS from completion of the reception of the notification frame 26A. The access point 11 transmits a BlockACK frame 29A including acknowledgment response information indicating a check result as to whether the reception of the data frames 27, 28 and 31 is success or failure.

As described so far, the present embodiment can omit from the inquiry frame, the terminal information field of the wireless terminal 1 which becomes a trigger for starting inquiry frame transmission, and can thereby shorten the inquiry frame. Moreover, the wireless terminal 1 that has transmitted the request frame 24 which becomes the trigger need not respond to the inquiry frame, and can thereby shorten the time from inquiry frame transmission to the start of UL-MU-MIMO transmission. Furthermore, at least the wireless terminal 1 includes uplink transmission data and can thereby avoid a situation that all the wireless terminals to be inquired include no uplink transmission data for the inquiry frame.

Seventh Embodiment

Figure 21:
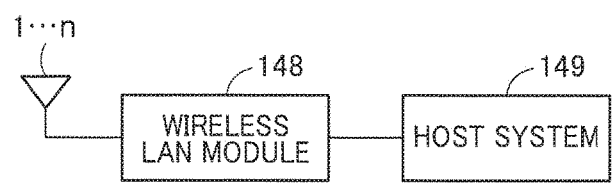
FIG. 21 is a diagram illustrating an overall configuration example of a terminal or access point according to a seventh embodiment.

FIG. 21 shows an example of entire configuration of a terminal or an access point. The example of configuration is just an example, and the present embodiment is not limited to this. The terminal or the access point includes one or a plurality of antennas 1 to n (n is an integer equal to or greater than 1), a wireless LAN module 148, and a host system 149. The wireless LAN module 148 corresponds to the wireless communication apparatus according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 22:
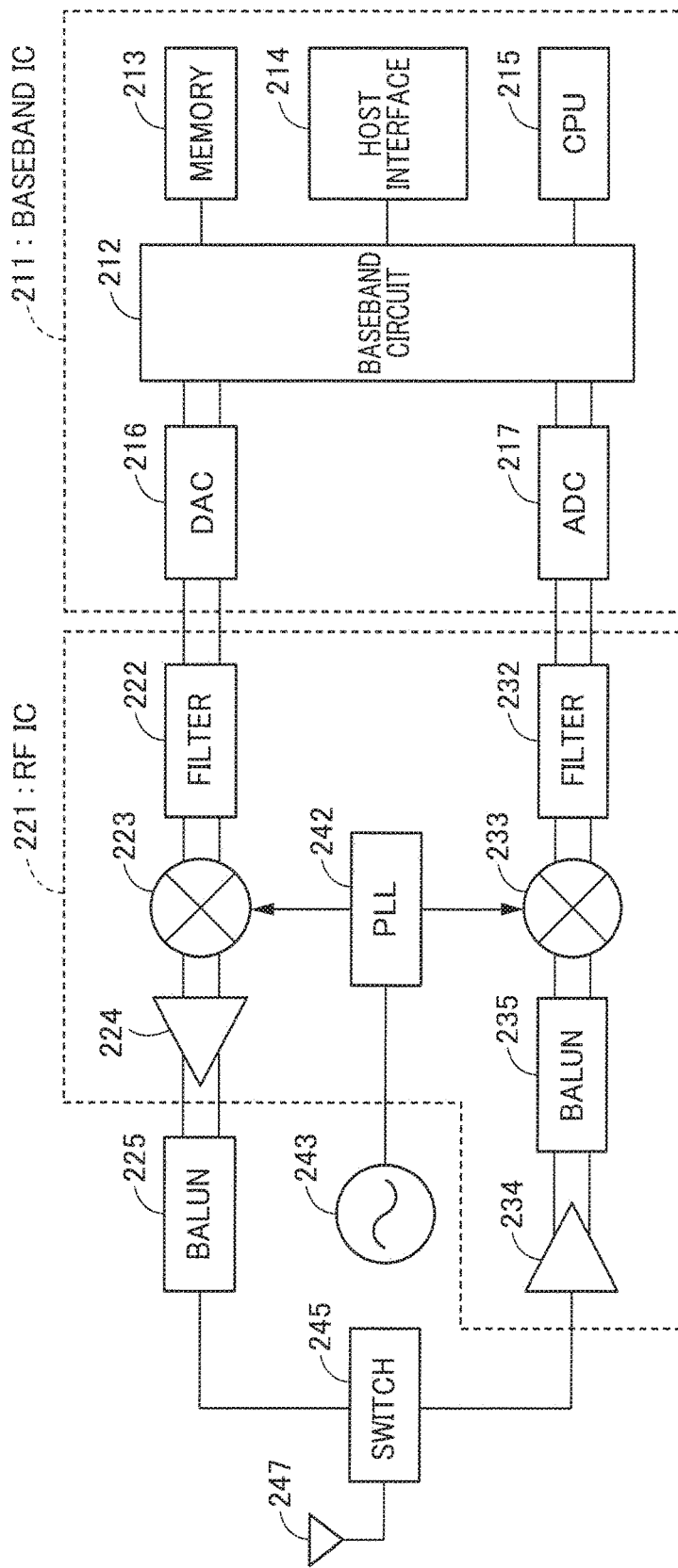
FIG. 22 is a diagram illustrating a hardware configuration example of a wireless communication device mounted on an access point or terminal according to a seventh embodiment.

FIG. 22 shows an example of hardware configuration of a wireless LAN module. The configuration can also be applied when the wireless communication apparatus is mounted on either one of the terminal that is a non-access point and an access point. Therefore, the configuration can be applied as an example of specific configuration of the wireless communication device shown in FIG. 11 or 12. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212.

The wireless LAN module (wireless communication apparatus) includes a baseband IC (Integrated Circuit) 211, an RF (Radio Frequency) IC 221, a balun 225, the switch 245, and the antenna 247. The wireless communication integrated circuit according to the present embodiment corresponds, for example, to the baseband IC or a set of the baseband ID and RF IC. The wireless communication integrated circuit further include the balun 225, switch 245, antenna 24 or a combination thereof.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the access point and information transmitted from the terminal or the access point. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Explanation for the more detailed processing of each block described so far is obvious from explanation of FIG. 11 and FIG. 12 and duplicated explanation is omitted.

Eight Embodiment

Figure 23:
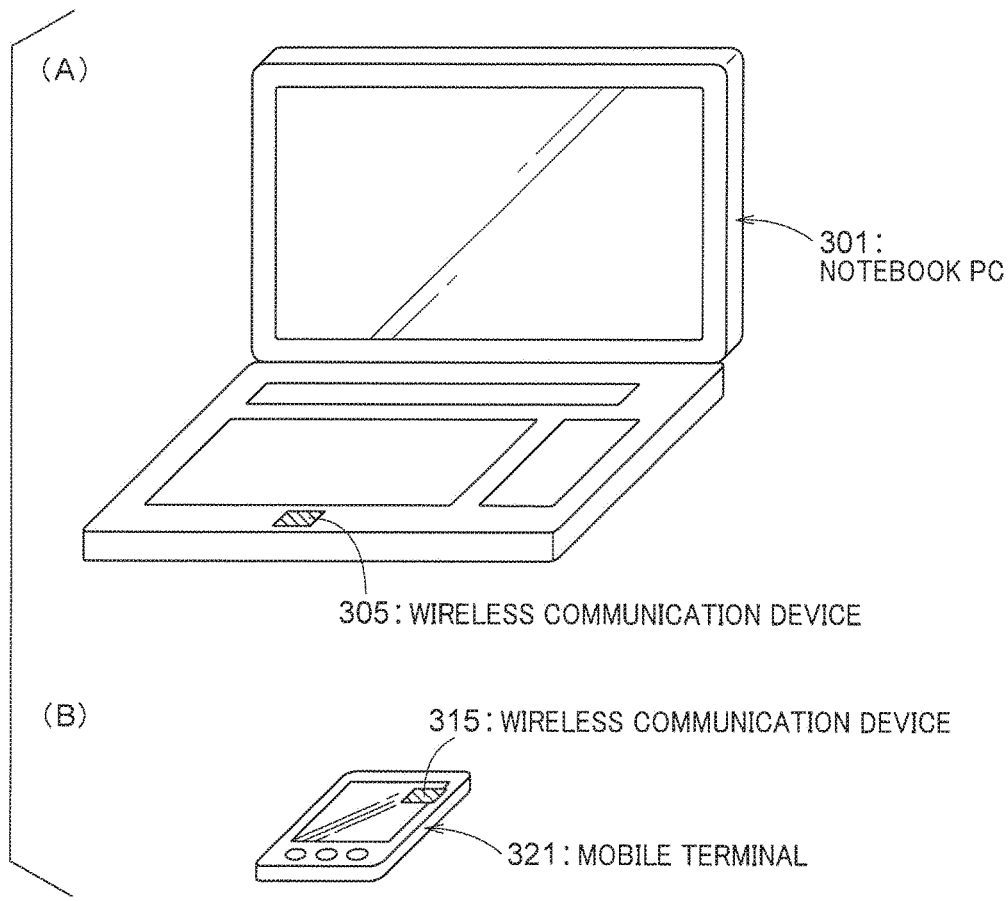
FIG. 23 is a perspective view of a wireless terminal according to an eighth embodiment.

FIG. 23(A) and FIG. 23(B) are perspective views of wireless terminal according to the fifth embodiment. The wireless terminal in FIG. 23(A) is a notebook PC 301 and the wireless communication device (or a wireless device) in FIG. 23(B) is a mobile terminal 321. Each of them corresponds to one form of a terminal (which may indicate an access point). The notebook PC 301 and the mobile terminal 321 are equipped with wireless communication devices 305 and 315, respectively. The wireless communication device provided in a terminal (which may indicate an access point) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone and so on.

Figure 24:
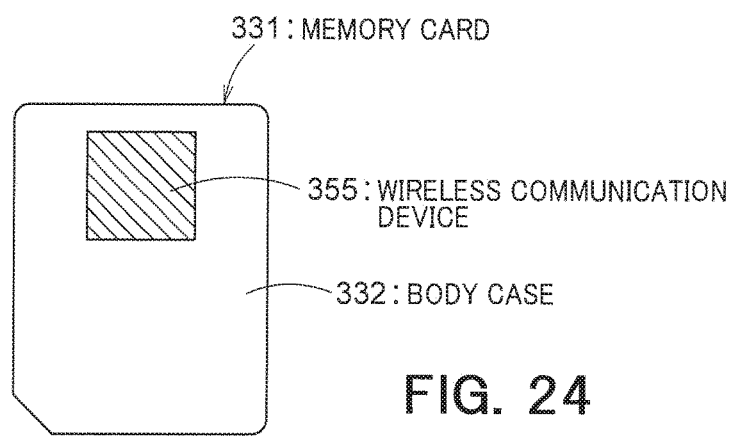
FIG. 24 is a diagram illustrating a memory card according to an eighth embodiment.

Moreover, a wireless communication device installed in a terminal (which may indicate an access point) can also be provided in a memory card. FIG. 24 illustrates an example of a wireless communication device mounted on a memory card. A memory card 331 contains a wireless communication device 355 and a body case 332. The memory card 331 uses the wireless communication device 355 for wireless communication with external devices. Here, in FIG. 24, the description of other installed elements (for example, a memory, and so on) in the memory card 331 is omitted.

Ninth Embodiment

In the ninth embodiment, a bus, a processor unit and an external interface unit are provided in addition to the configuration of the wireless communication device according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware.

Tenth Embodiment

In the seventh embodiment, a clock generating unit is provided in addition to the configuration of the wireless communication device according to any of any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eleventh Embodiment

In the eleventh embodiment, a power source unit, a power source controlling unit and a wireless power feeding unit are included in addition to the configuration of the wireless communication device according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Twelfth Embodiment

In the twelfth embodiment, a SIM card is added to the configuration of the wireless communication device according to any of the above embodiments. For example, the SIM card is connected with the transmitter, the receiver or the controller in the wireless communication device. Thus, by adopting a configuration in which the SIM card is included in the wireless communication device, authentication processing can be easily performed.

Thirteenth Embodiment

In the thirteenth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Fourteenth Embodiment

In the fourteenth embodiment, an LED unit is added to the configuration of the wireless communication device according to any of the above embodiments. For example, the LED unit is connected to the transmitter, the receiver or the controller. Thus, by adopting a configuration in which the LED unit is included in the wireless communication device, notifying the operation state of the wireless communication device to the user can be easily done.

Fifteenth Embodiment

In the fifteenth embodiment, a vibrator unit is included in addition to the configuration of the wireless communication device according to any of the embodiments. For example, the vibrator unit is connected to the transmitter, the receiver or the controller. Thus, by adopting a configuration in which the vibrator unit is included in the wireless communication device, notifying the operation state of the wireless communication device to the user can be easily done.

Sixteenth Embodiment

In the embodiment, the configuration of the wireless communication device includes a display in addition to the configuration of the wireless communication device (which may indicate the wireless communication device mounted in the terminal, the wireless communication device mounted in the access point) according to any one of the above embodiments. The display may be connected to the first controller or the second controller in the wireless communication device via a bus (not shown). As seen from the above, the configuration including the display to display the operation state of the wireless communication device on the display allows the operation status of the wireless communication device to be easily notified to a user.

Fourteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication access point disconnects with a wireless communication terminal, for example, the access point deletes information on the wireless communication device from a connection management table if the access point holds the connection management table for managing wireless communication terminals which entries into the BSS of the access point-self. For example, in a case that the access point assigns an AID to each wireless communication terminal which entries into the BSS at the time when the access point permitted each wireless communication terminal to connect to the access point-self in the association process, the access point deletes the held information related to the AID of the wireless communication terminal disconnected with the access point and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 25:
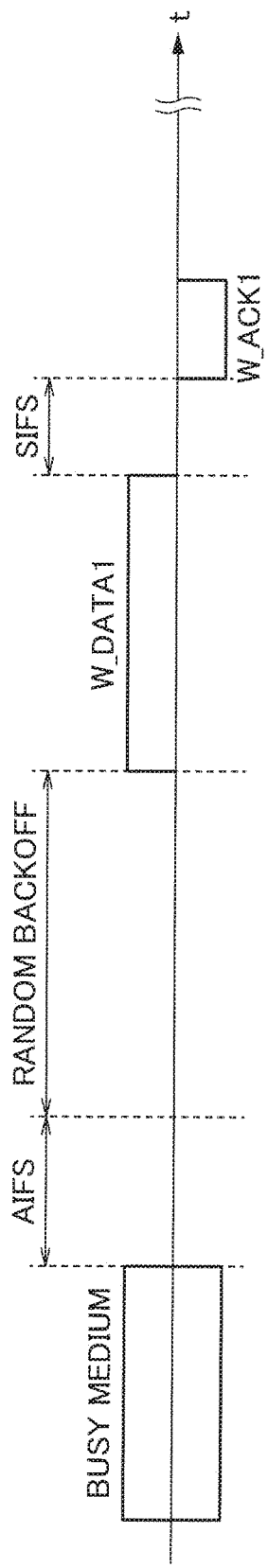
FIG. 25 is a diagram illustrating an example of frame exchange during a contention period.

Here, FIG. 25 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

Note that the frames described in the embodiments may indicate not only things called frames in, for example, IEEE 802.11 standard, but also things called packets, such as Null Data Packets.

The multiple frames to be transmitted by the terminals may be identical to or different from each other. As to general representation, in a case of representation that the terminals transmits or receives multiple X-th frames, these X-th frames may be identical to or different from each other. Further, in a case of representation that the terminals sequentially transmit multiple X-th frames, these X-th frames may be identical to or different from each other. In either case, any value may be substituted into X according to the situations.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device communicating with a plurality of other wireless communication devices comprising:
    controlling circuitry configured to select, from among the other wireless communication devices, first wireless communication devices for inquiring whether to have data for uplink multiuser multiplexing transmission and determine parameter information of a contention window used in CSMA/CA (carrier sense multiple access/collision avoidance) for the first wireless communication devices on basis of a number of the first wireless communication devices;
    a transmitter configured to transmit a first frame to the first wireless communication devices, wherein the first frame includes information to specify the first wireless communication devices and the parameter information, and the first frame instructs the first wireless communication devices to use the contention window based on the parameter information for acquisition of a transmission right for transmission of a response frame for the first frame; and
    a receiver configured to sequentially receive second frames transmitted based on the acquired transmission right from the first wireless communication devices in a single user manner wherein the second frames are response frames for the first frame and the transmission right is acquired under carrier sensing during a backoff time determined based on a value selected randomly from the contention window,
    wherein the controlling circuitry is configured to select second wireless communication devices for execution of uplink multiuser multiplexing transmission from among the first wireless communication devices which have transmitted the second frame.

2. The wireless communication device according to claim 1, wherein the parameter information defines a range of random numbers as the contention window, and
    the controlling circuitry is configured to determine the parameter information so as to increase the range of random numbers as the number of first wireless communication devices increases.

3. The wireless communication device according to claim 1, wherein the controlling circuitry is configured to determine the parameter information on basis of a number of wireless communication devices supporting an uplink multiuser multiplexing scheme among the first wireless communication devices.

4. The wireless communication device according to claim 1, wherein the controlling circuitry is configured to determine the parameter information on basis of a number of wireless communication devices that are not transited into a low power consumption mode among the first wireless communication devices.

5. The wireless communication device according to claim 1, wherein the transmitter is configured to transmit a fourth frame including information to specify the second wireless communication devices, and
    the receiver is configured to receive fifth frames transmitted in the uplink multiuser multiplexing from the second wireless communication devices a predetermined time after the fourth frame is transmitted.

6. The wireless communication device according to claim 5, wherein the transmitter is configured to transmit the fourth frame when a predetermined condition is satisfied after the first frame is transmitted.

7. The wireless communication device according to claim 6, wherein the transmitter is configured to transmit the fourth frame when at least any one of following cases is established as the predetermined condition: a case where a predetermined time limit reaches after the first frame is transmitted; a case where response frames are received from a predetermined number of wireless communication devices of the wireless communication devices specified in the fourth frame after the first frame is transmitted; and a case where response frames are received from all of the first wireless communication devices specified in the first frame.

8. The wireless communication device according to claim 1, wherein the receiver is configured to receive a sixth frame from one of the other wireless communication devices,
    the controlling circuitry is configured to select, when the sixth frame is received from the first wireless communication devices from among wireless communication devices other than one of the other wireless communication devices; and
    select, the second wireless communication devices from among the one of the other wireless communication devices and the first wireless communication devices which have transmitted the response frames.

9. The wireless communication device according to claim 1, further comprising at least one antenna.

10. A wireless communication device communicating with a plurality of other wireless communication devices, comprising:
    controlling circuitry configured to select, from among the other wireless communication devices, first wireless communication devices for inquiring whether to have data for uplink multiuser multiplexing transmission and determine parameter information of a contention window used in CSMA/CA (carrier sense multiple access/collision avoidance) for the first wireless communication devices on a basis of a number of the first wireless communication devices;
    a transmitter configured to transmit a first frame to the first wireless communication devices, wherein the first frame includes information to specify the first wireless communication devices and the parameter information, and the first frame instructs the first wireless communication devices to use the contention window based on the parameter information for acquisition of transmission right for transmission of a response frame for the first frame; and
    a receiver configured to sequentially receive second frames transmitted based on the acquired transmission right from the first wireless communication devices in a single user manner, wherein the second frames are response frames for the first frame and
    include identification of whether the first wireless communication devices have the data for uplink multiuser multiplexing transmission,
    wherein
    the controlling circuitry is configured to specify wireless communication devices having the data for uplink multiuser multiplexing transmission from among the first wireless communication devices based on the received second frames and to select second wireless communication devices for execution of the uplink multiuser multiplexing transmission from among the specified wireless communication devices.

11. A wireless communication device comprising:
a receiver configured to receive a first frame including information to specify one or more wireless communication devices from a base station; and
controlling circuitry configured to determine parameter information of a contention window used in CSMA/CA based on a number of the wireless communication devices specified in the first frame and perform carrier sensing during a backoff time determined based on a value selected randomly from the contention window specified by the parameter information; and
a transmitter configured to transmit a response frame for the first frame in a single user manner in accordance with a transmission right acquired when a result of the carrier sensing is idle.

12. The wireless communication device according to claim 11, wherein the parameter information defines a range of random numbers as the contention window.

13. The wireless communication device according to claim 11, wherein the transmitter is configured to transmit the response frame, for the first frame when the first frame includes information to specify the wireless communication device and when the wireless communication device has data for uplink multiuser multiplexing transmission.

14. The wireless communication device according to claim 13, wherein the response frame for the first frame includes information for specifying whether the wireless communication device has the data for uplink multiuser multiplexing transmission.

15. The wireless communication device according to claim 11, further comprising at least one antenna.

* * * * *